US008099282B2

(12) United States Patent
Masuda

(10) Patent No.: US 8,099,282 B2
(45) Date of Patent: Jan. 17, 2012

(54) VOICE CONVERSION SYSTEM

(75) Inventor: Tsuyoshi Masuda, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 894 days.

(21) Appl. No.: 12/085,922

(22) PCT Filed: Nov. 28, 2006

(86) PCT No.: PCT/JP2006/323667

§ 371 (c)(1),
(2), (4) Date: May 30, 2008

(87) PCT Pub. No.: WO2007/063827

PCT Pub. Date: Jun. 7, 2007

(65) Prior Publication Data

US 2010/0198600 A1 Aug. 5, 2010

(30) Foreign Application Priority Data

Dec. 2, 2005 (JP) ................................ 2005-349754

(51) Int. Cl.
*G10L 11/00* (2006.01)
*G10L 15/00* (2006.01)
*G10L 13/00* (2006.01)
*G10L 21/00* (2006.01)

(52) U.S. Cl. ......... 704/270; 704/231; 704/258; 704/272

(58) Field of Classification Search ........................ None
See application file for complete search history.

(56) References Cited

U.S. PATENT DOCUMENTS

| | | | | |
|---|---|---|---|---|
| 5,327,521 A * | 7/1994 | Savic et al. | .................. | 704/272 |
| 6,336,092 B1 * | 1/2002 | Gibson et al. | ................ | 704/268 |
| 7,275,032 B2 * | 9/2007 | Macleod | ....................... | 704/243 |
| 7,792,672 B2 * | 9/2010 | Rosec et al. | .................. | 704/246 |
| 2002/0173962 A1 * | 11/2002 | Tang et al. | .................... | 704/260 |
| 2003/0055647 A1 * | 3/2003 | Yoshioka et al. | ............. | 704/258 |
| 2004/0054524 A1 * | 3/2004 | Baruch | ......................... | 704/201 |
| 2005/0256716 A1 * | 11/2005 | Bangalore et al. | ............ | 704/260 |
| 2008/0161057 A1 * | 7/2008 | Nurminen et al. | ............ | 455/563 |

FOREIGN PATENT DOCUMENTS

EP 2006/082287 A1 8/2006

(Continued)

OTHER PUBLICATIONS

Binh Phu Nguyen, et al., Spectral Modification for Voice Gender Conversion Using Temporal Decomposition, Journal of Signal Processing, vol. 1, No. 4, pp. 333-336, Jul. 2007.

(Continued)

*Primary Examiner* — Brian Albertalli

(74) *Attorney, Agent, or Firm* — Morgan, Lewis & Bockius LLP

(57) ABSTRACT

A voice conversion training system, voice conversion system, voice conversion client-server system, and program that realize voice conversion to be performed with low load of training are provided.

In a server 10, an intermediate conversion function generation unit 101 generates an intermediate conversion function F, and a target conversion function generation unit 102 generates a target conversion function G. In a mobile terminal 20, an intermediate voice conversion unit 211 uses the conversion function F to generate speech of an intermediate speaker from speech of a source speaker, and a target voice conversion unit 212 uses the conversion function G to convert speech of the intermediate speaker speech generated by the intermediate voice conversion unit 211 to speech of a target speaker.

15 Claims, 21 Drawing Sheets

FOREIGN PATENT DOCUMENTS

| | | |
|---|---|---|
| JP | 7-104792 | 4/1995 |
| JP | 9-146597 | 6/1997 |
| JP | 11-85194 | 3/1999 |
| JP | 2002-182683 | 6/2002 |
| JP | 2002-215198 | 7/2002 |
| JP | 2002-244689 | 8/2002 |
| JP | 2005-266349 | 9/2005 |

OTHER PUBLICATIONS

Iwahashi, N., et al., *Speech Spectrum Conversion Based on Speaker Interpolation and Multi-Functional Representation With Weighting by Radial Basis Function Networks*, vol. 16, Issue 2, Feb. 1995, pp. 139-151.

Office Action from the Korean Patent Office dated Aug. 24, 2010.

Kain, et al. "Spectral voice conversion for text-to-speech synthesis".

* cited by examiner

[Figure 1]
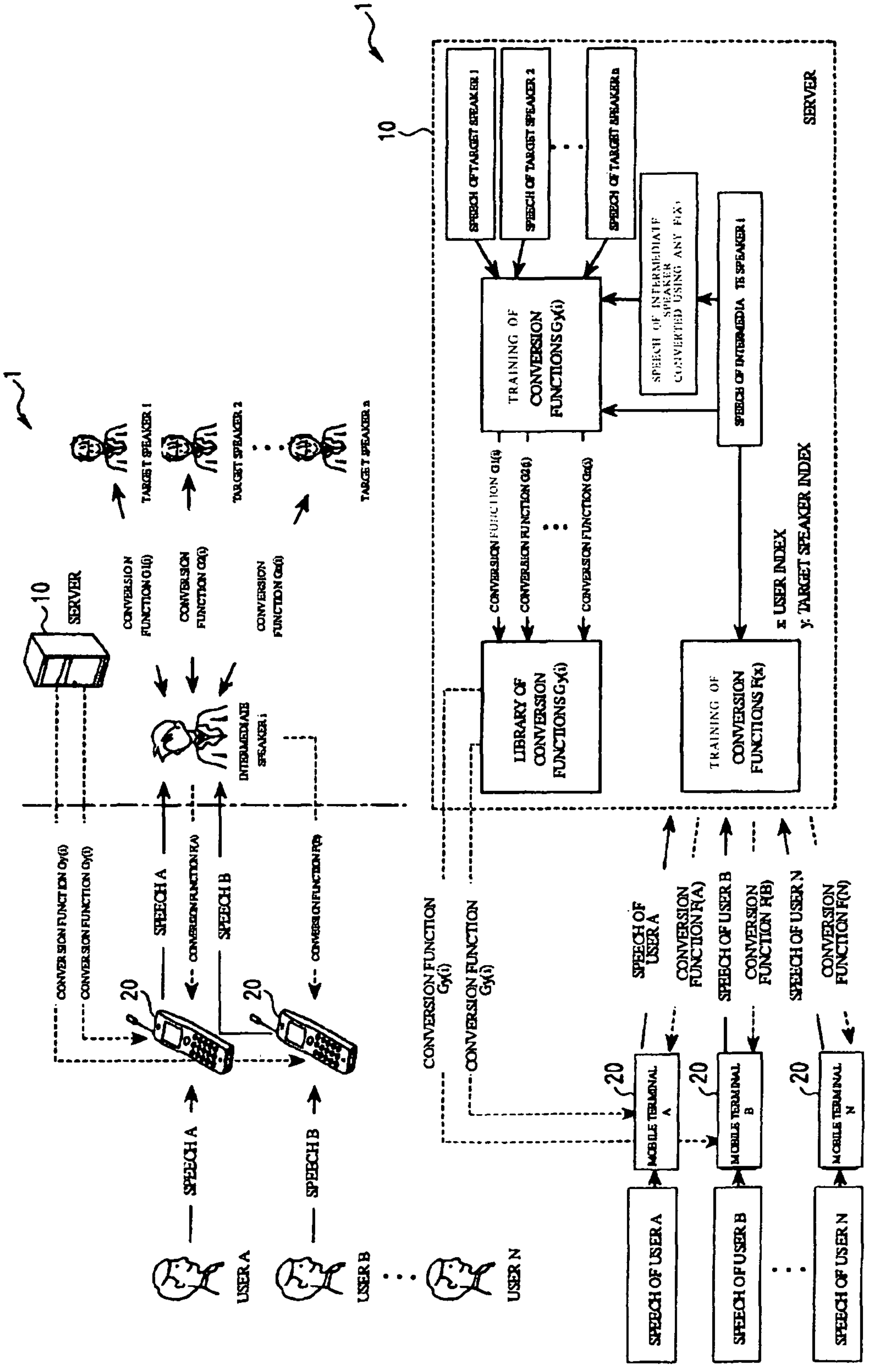

[Figure 2]
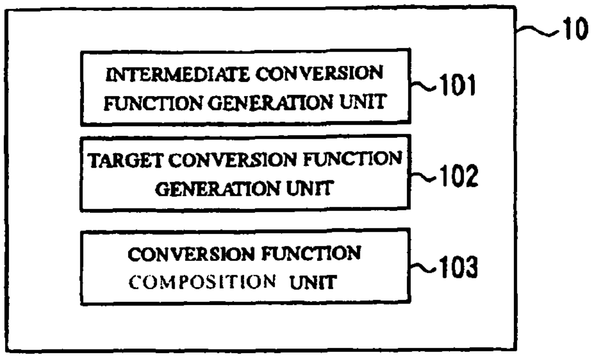
[Figure 3]
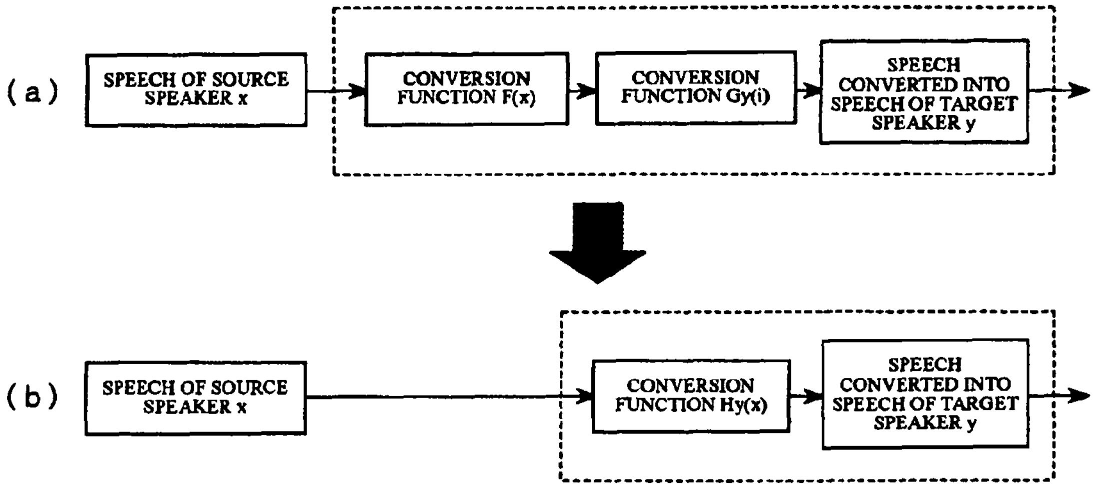

[Figure 4]
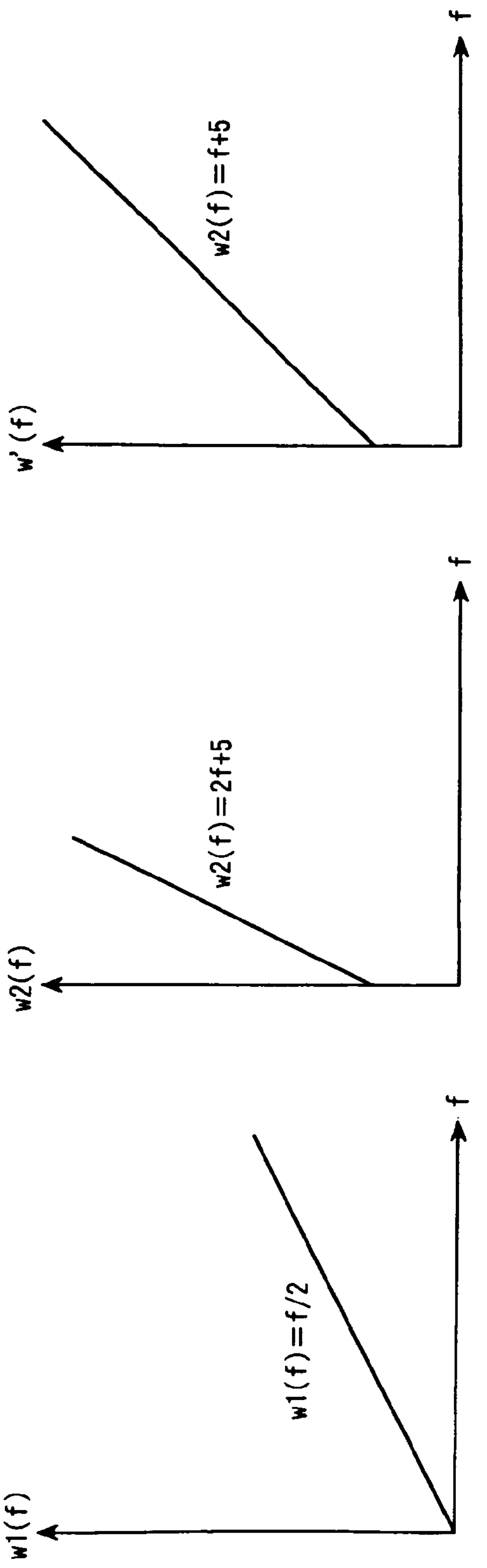

[Figure 5]
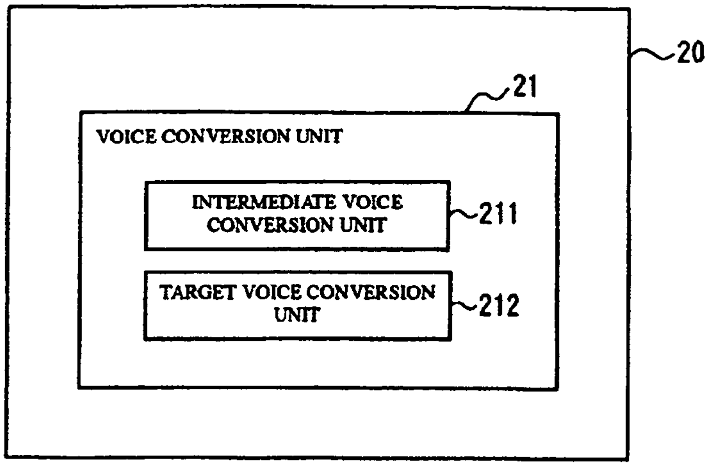
[Figure 6]
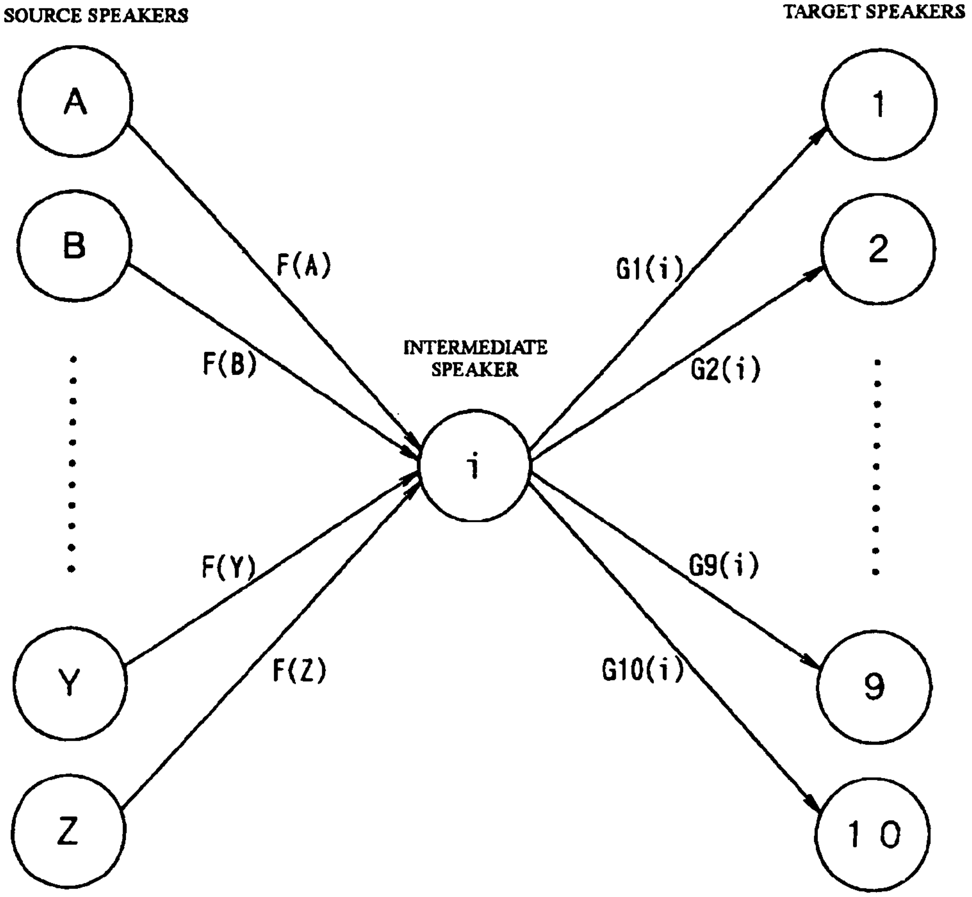

[Figure 7]
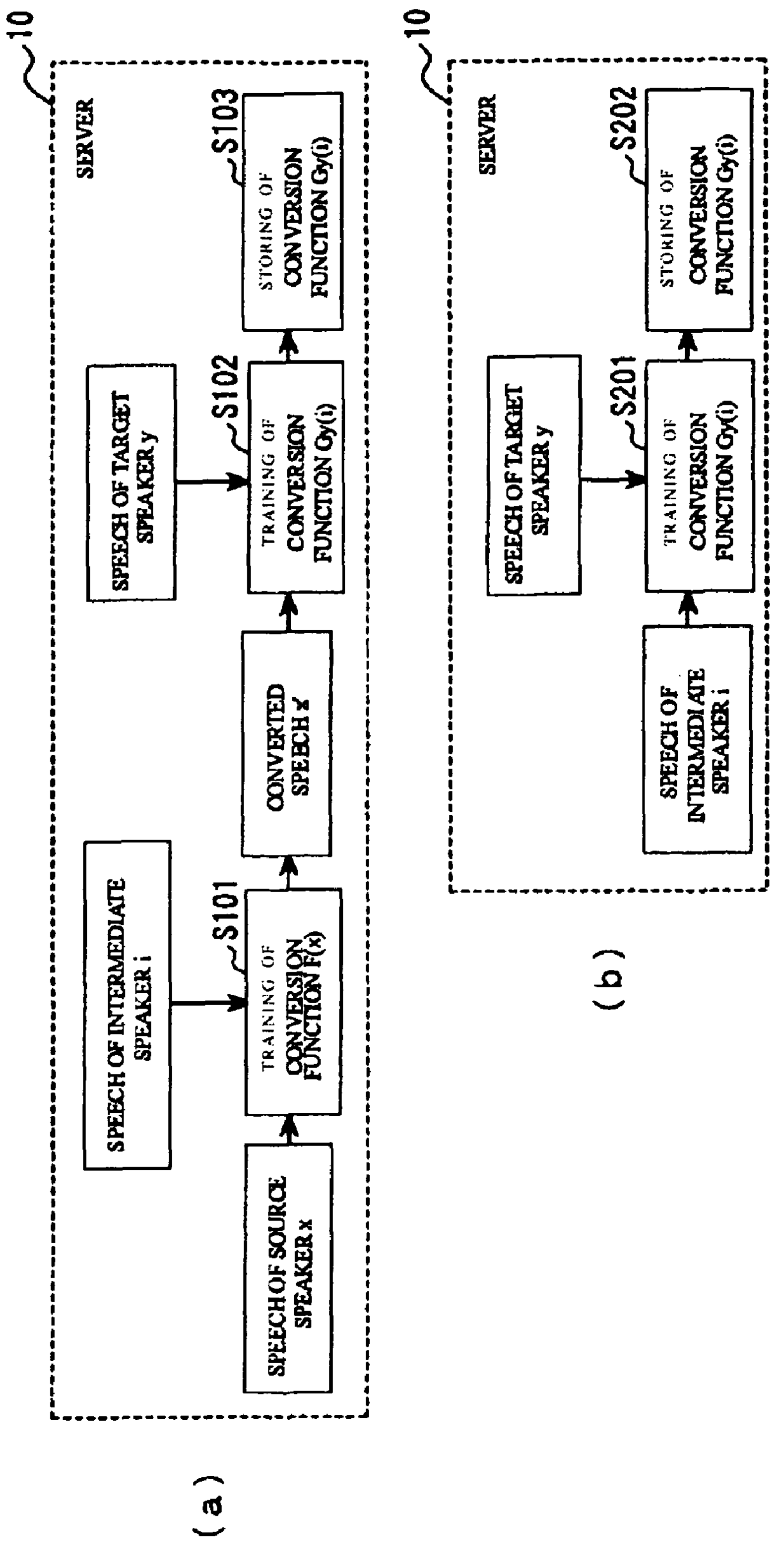

[Figure 8]
(a)
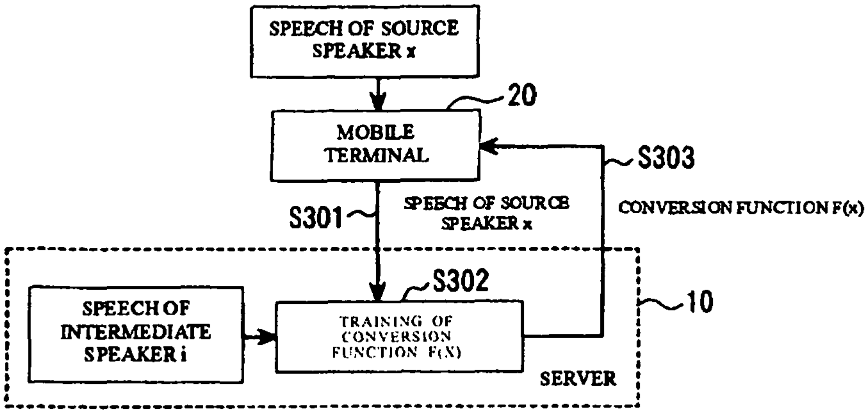
(b)
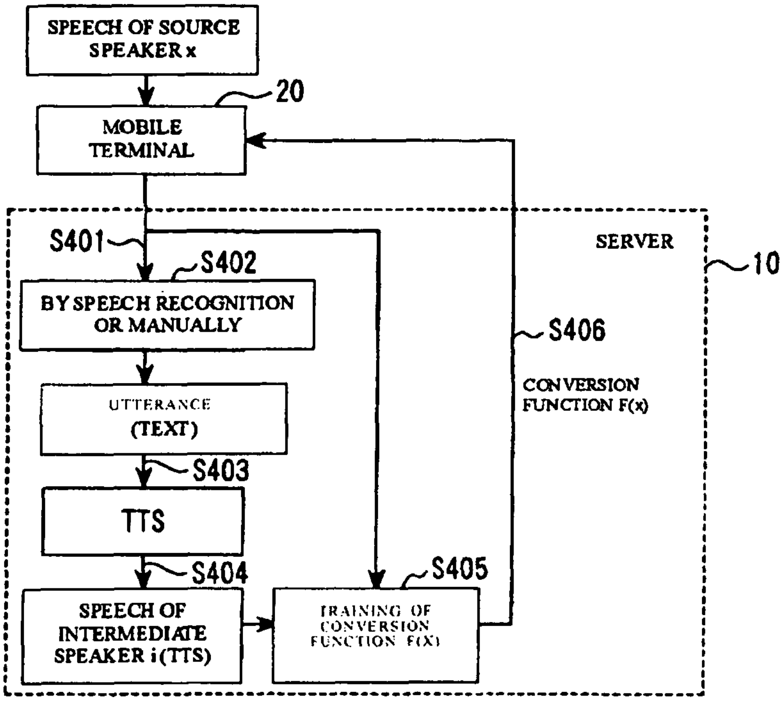

[Figure 9]
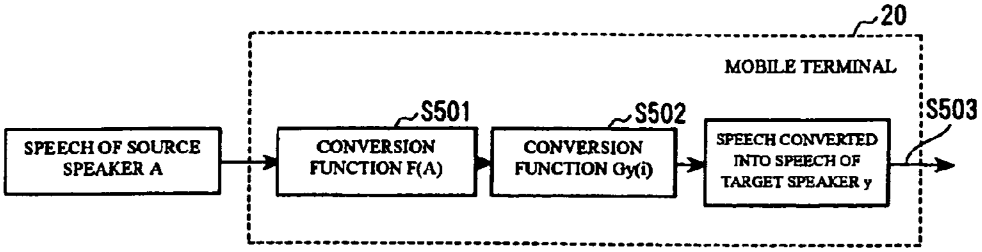

[Figure 10]
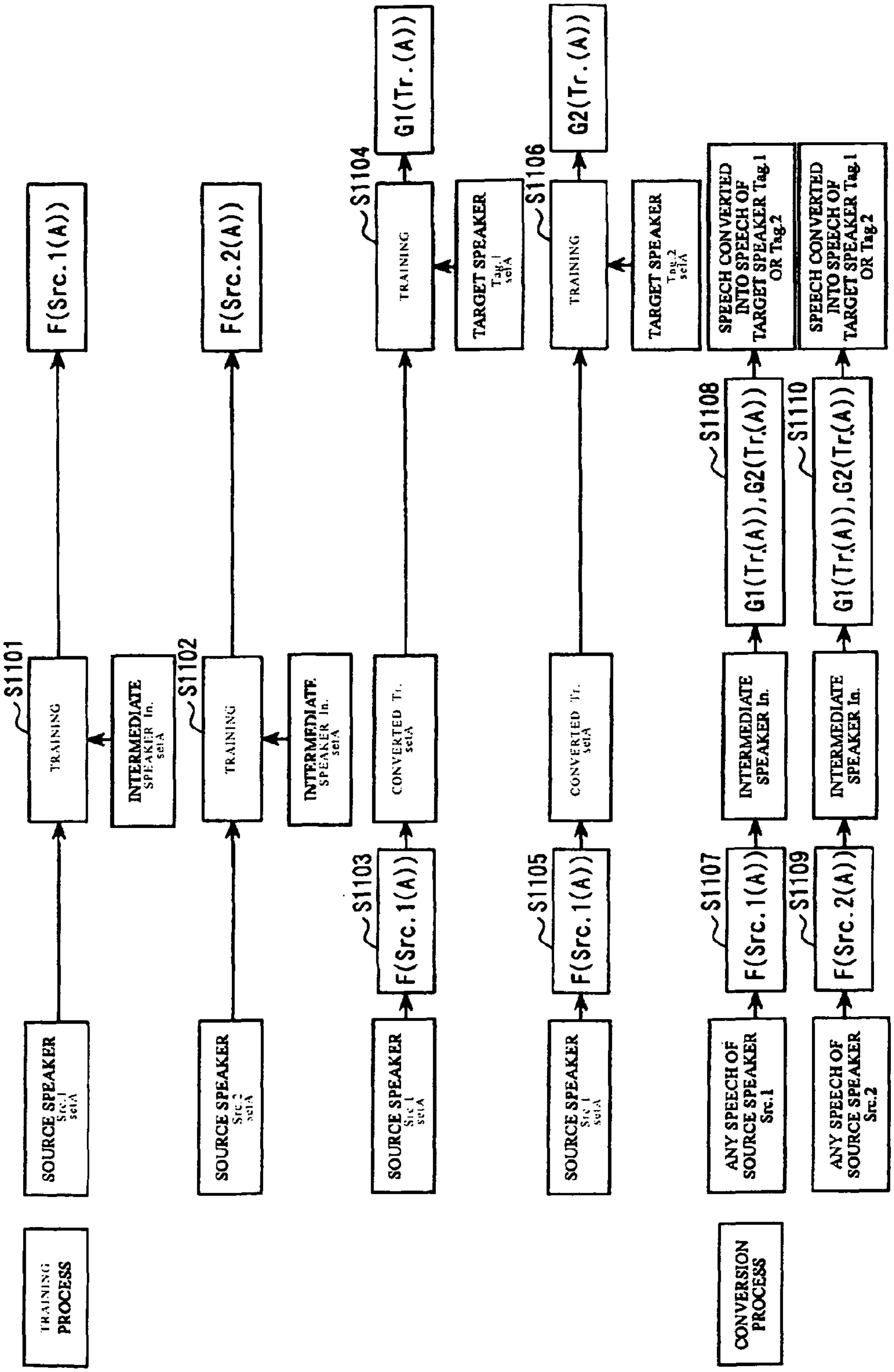

[Figure 11]
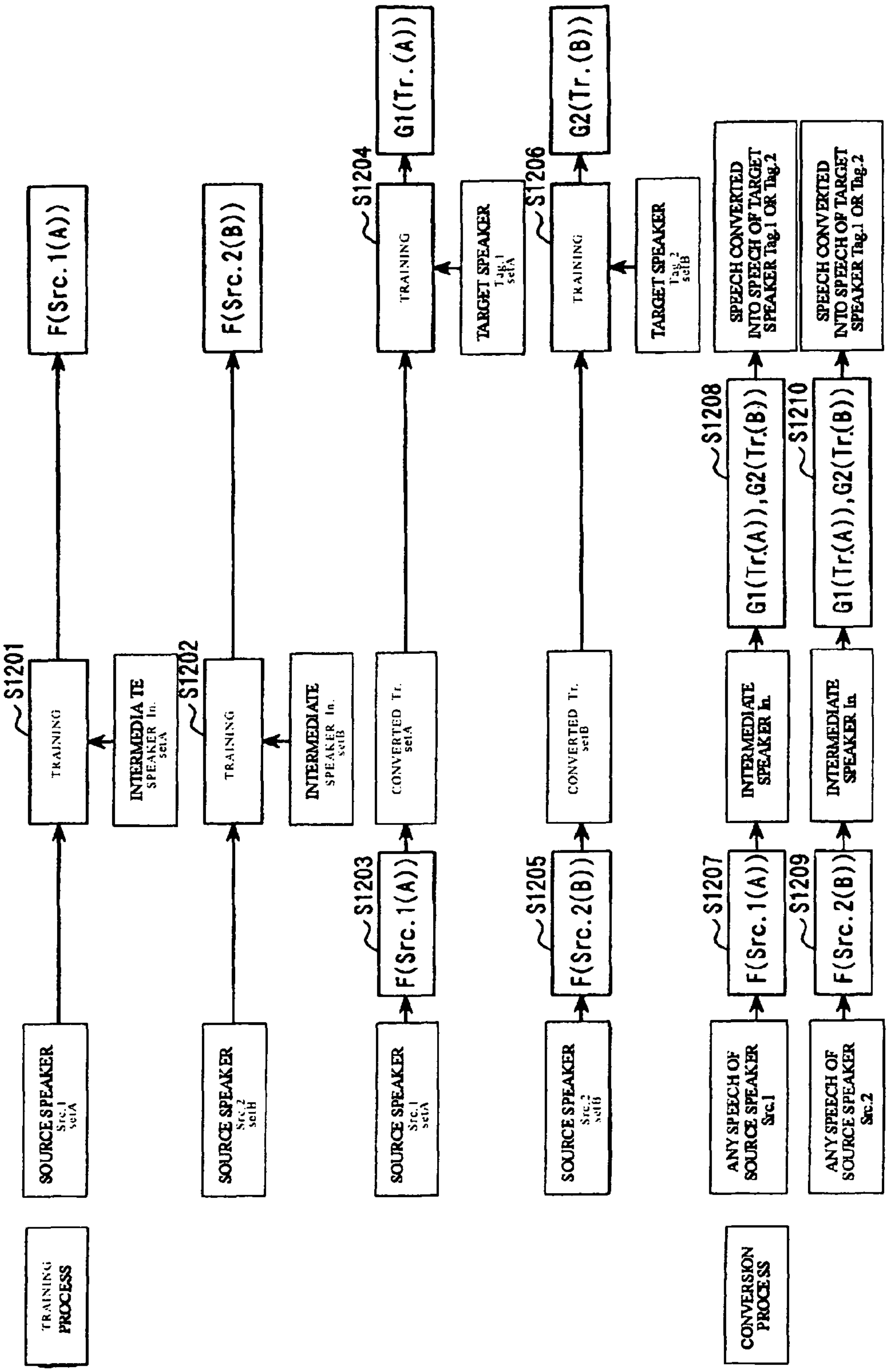

[Figure 12]
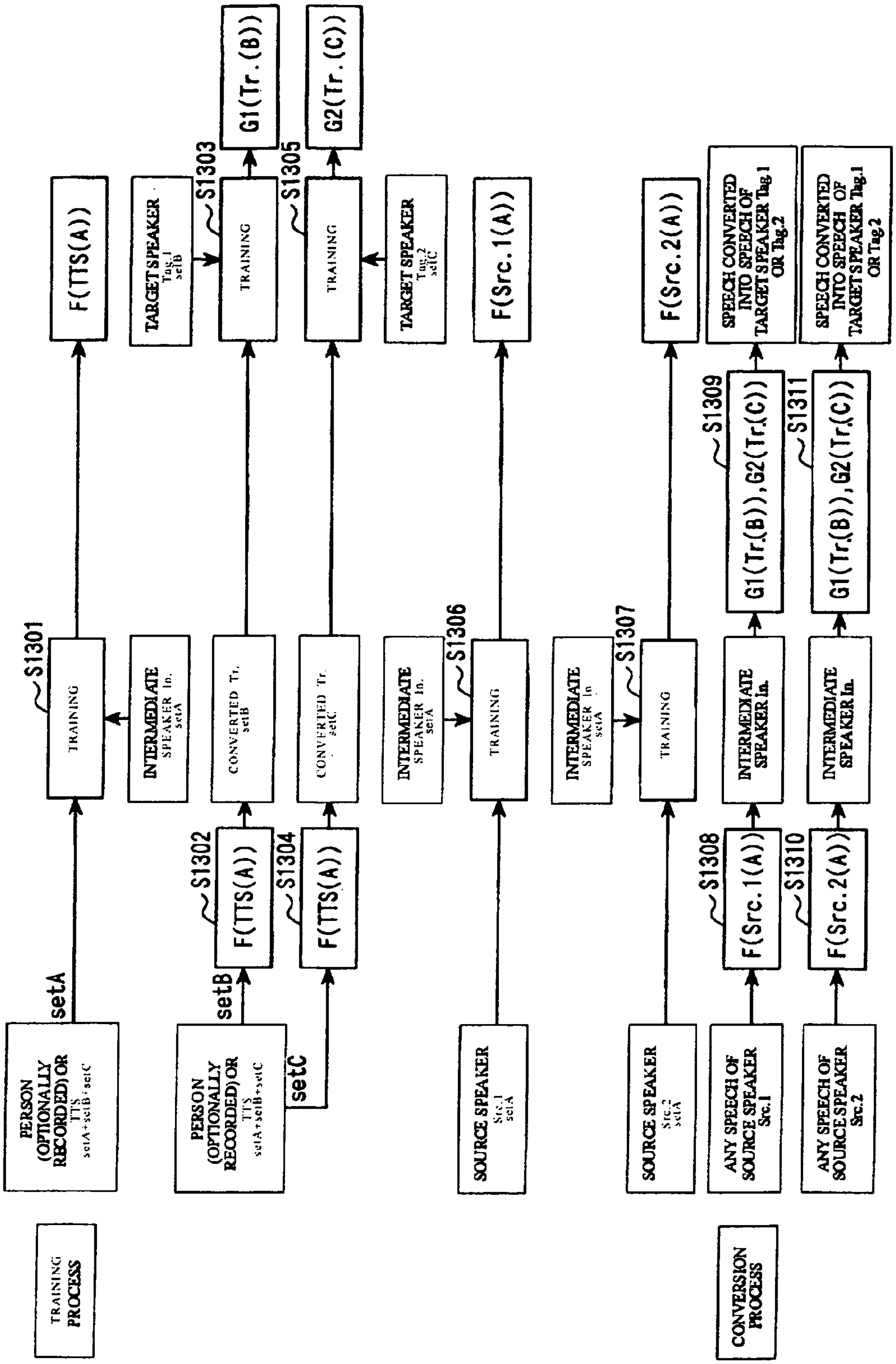

[Figure 13]
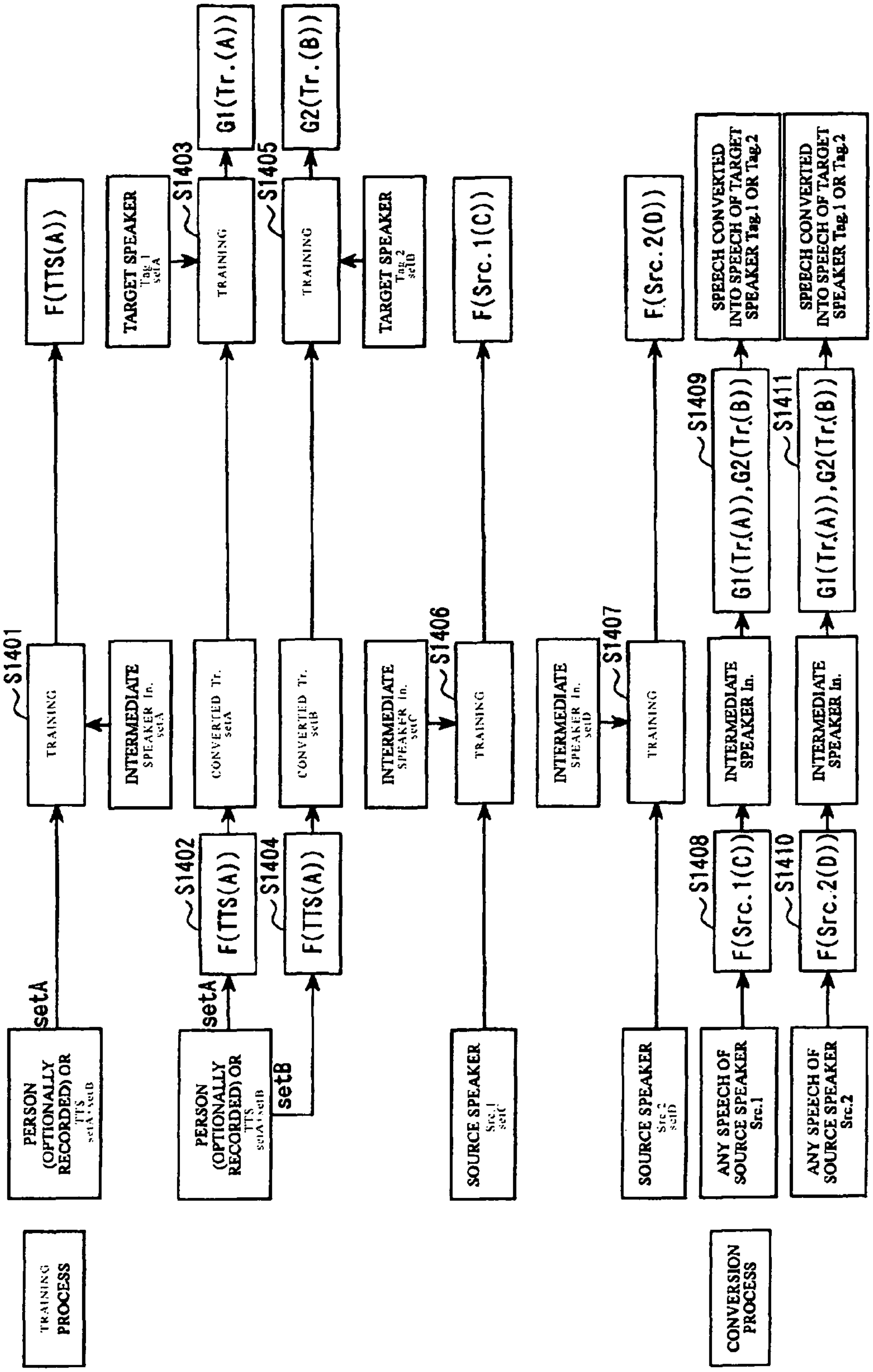

[Figure 14]
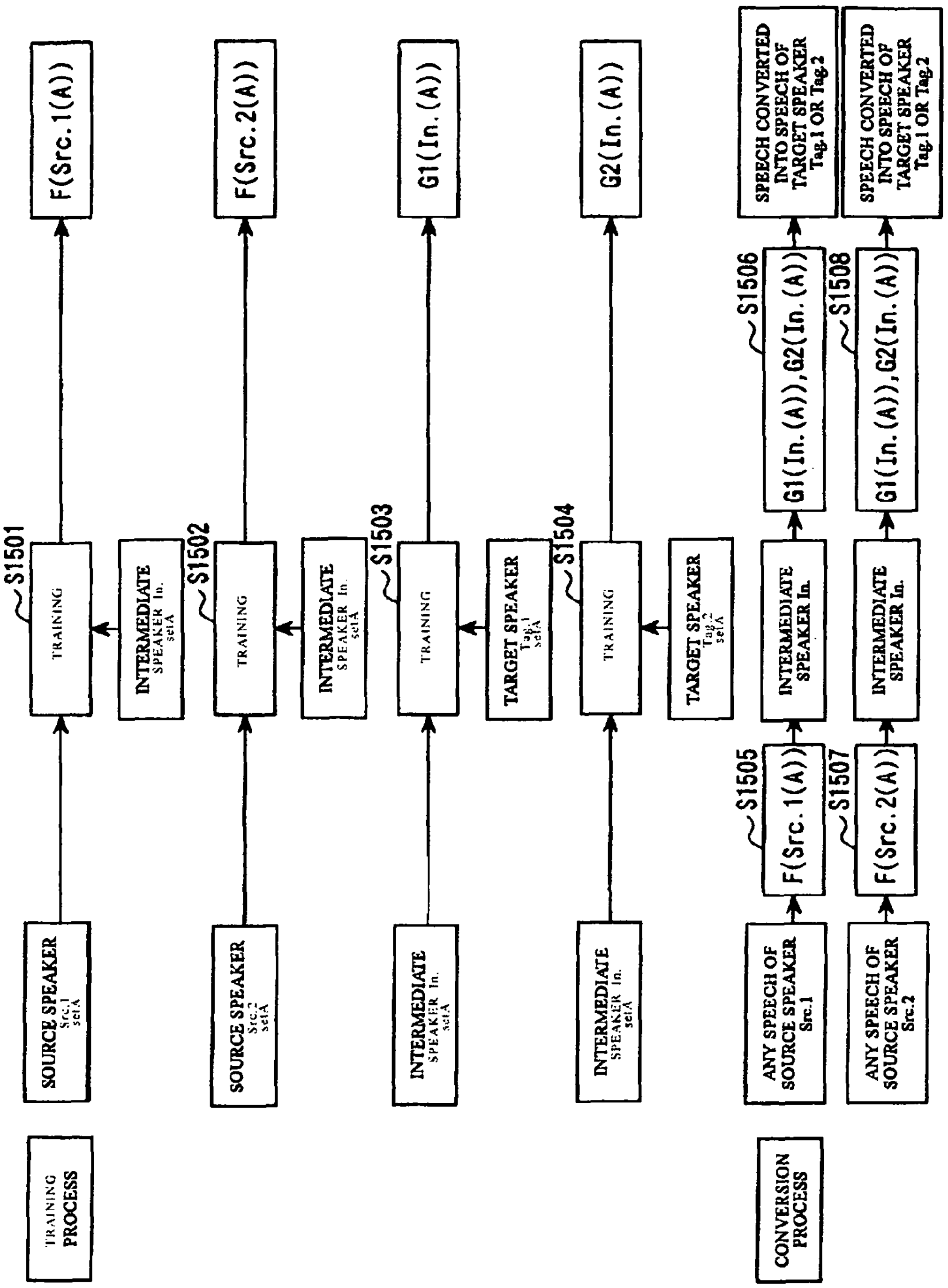

[Figure 15]
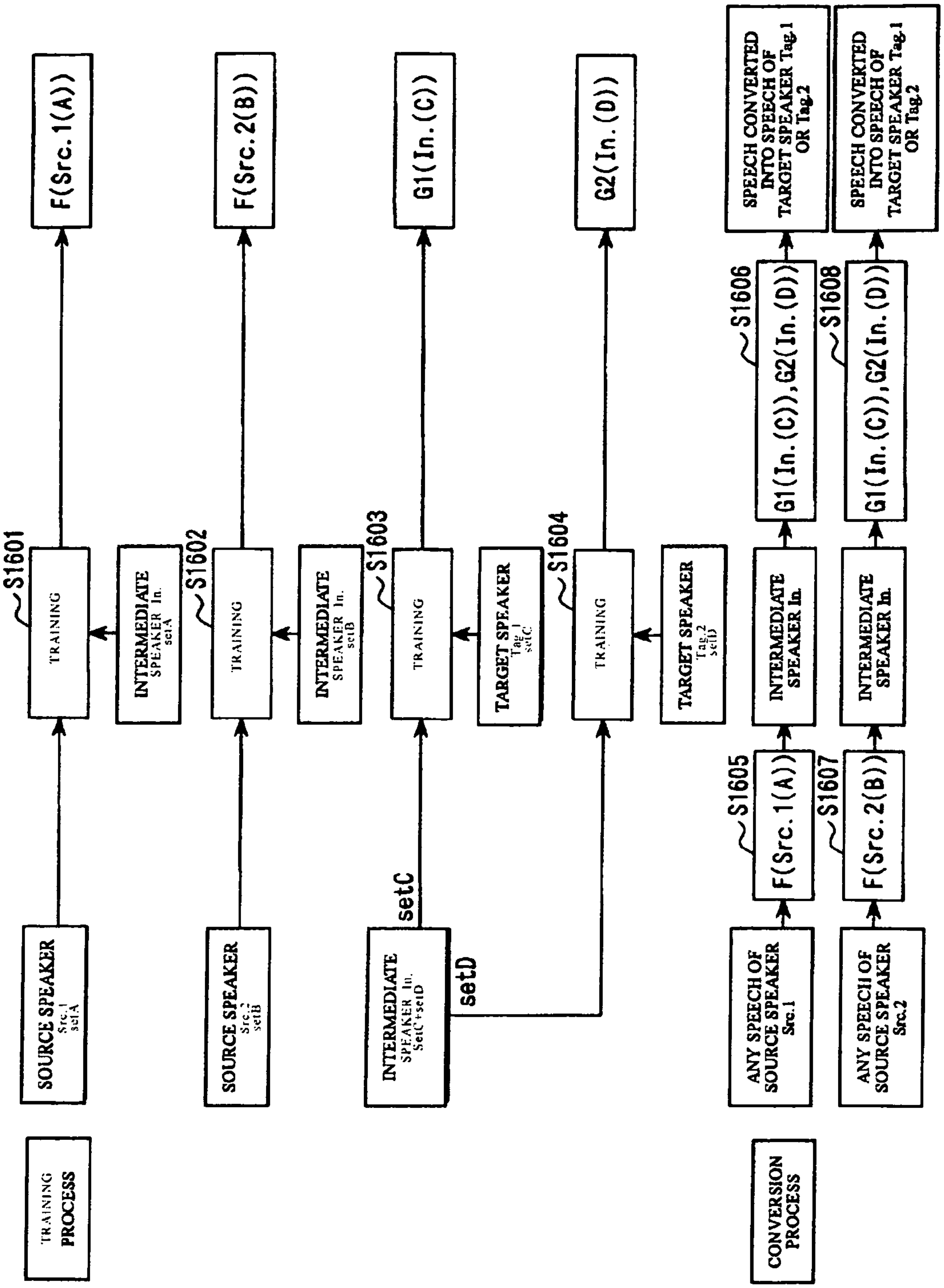

[Figure 16]
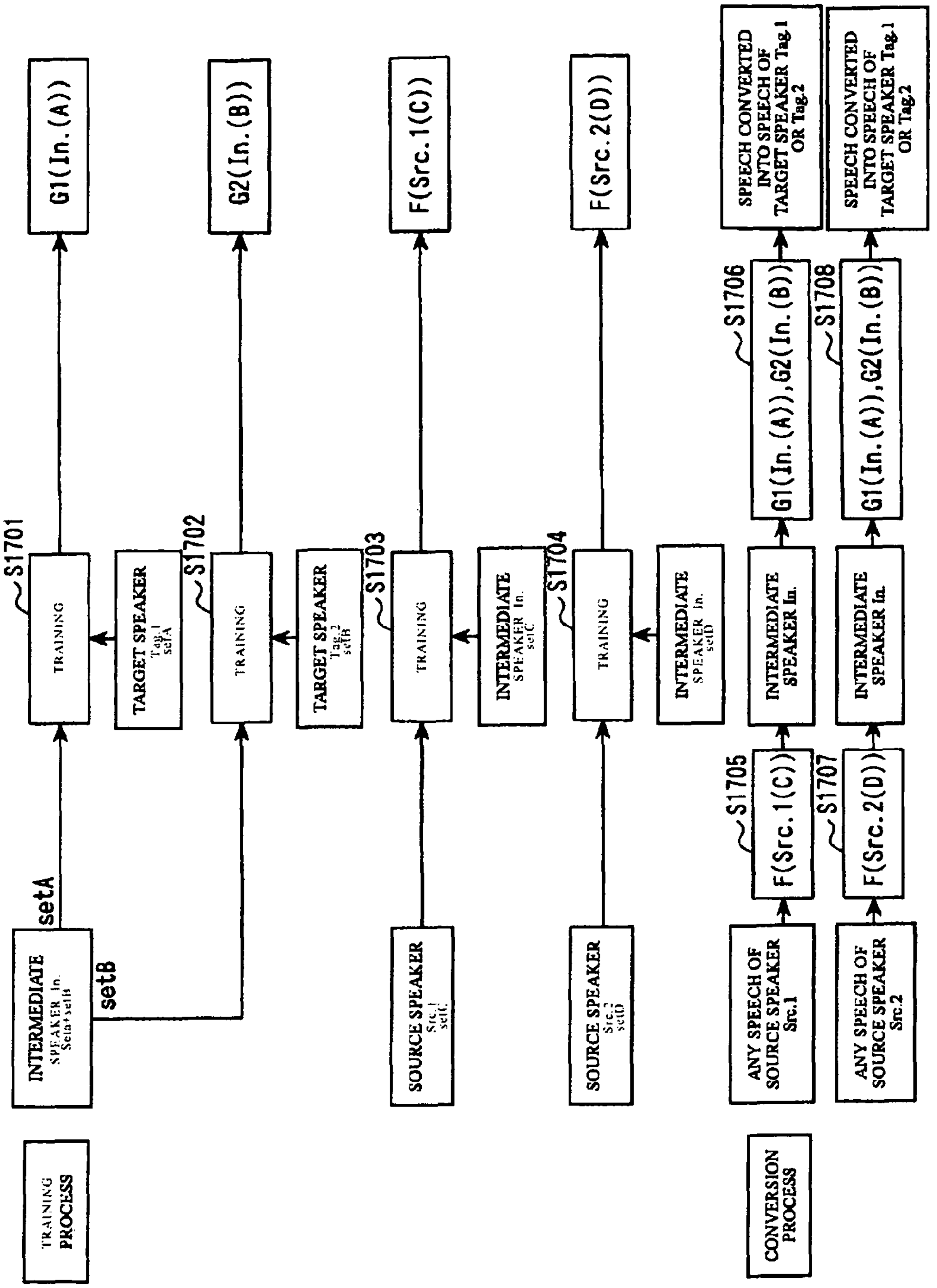

[Figure 17]
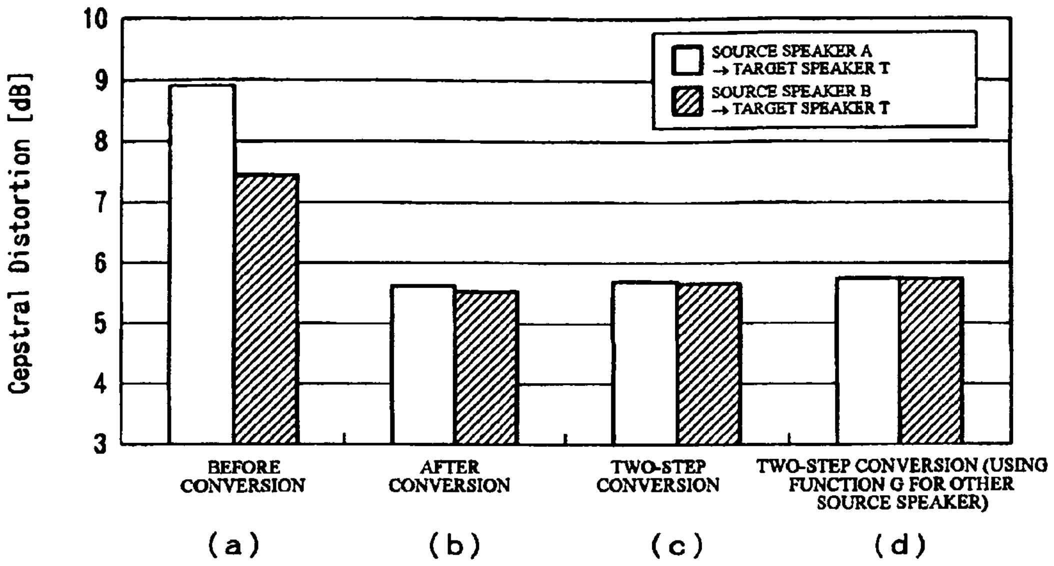

[Figure 18]
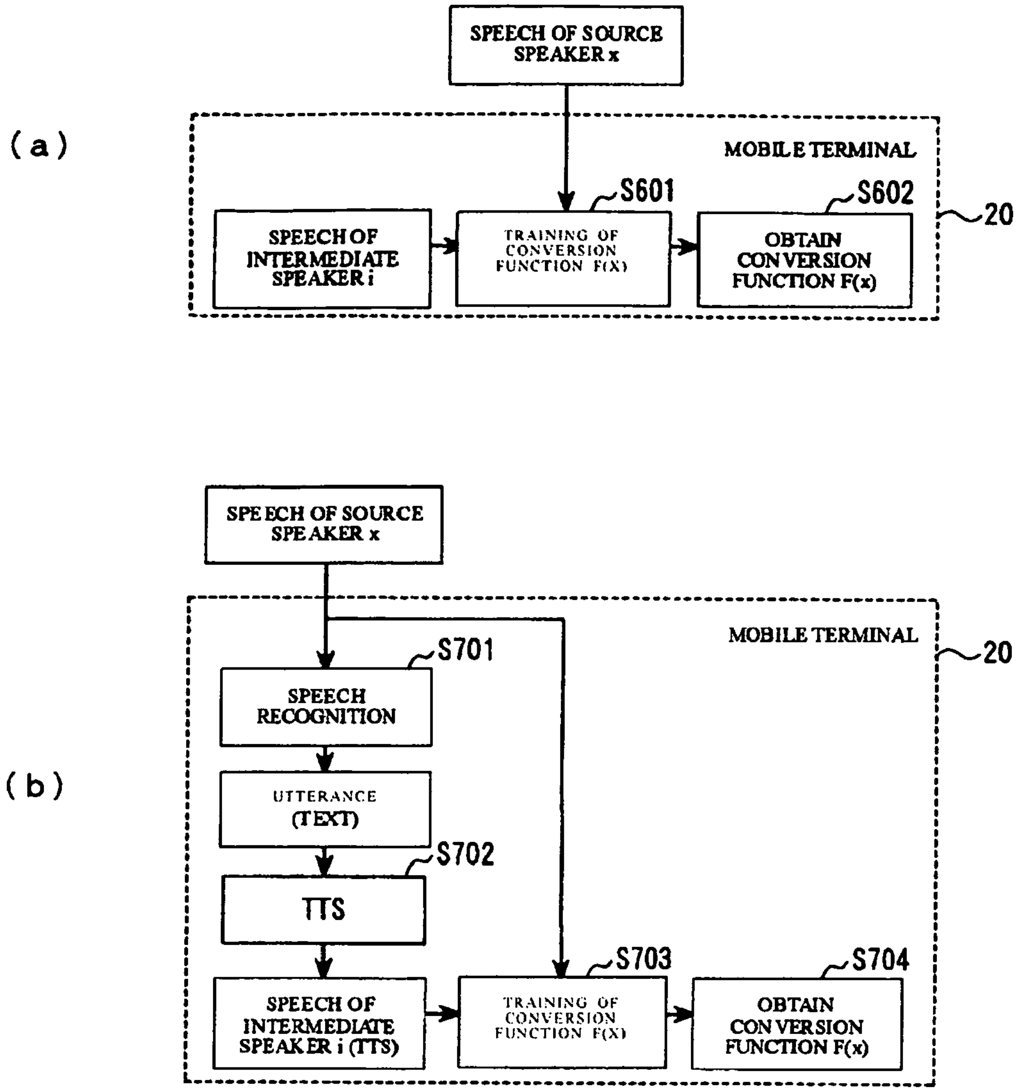

[Figure 19]
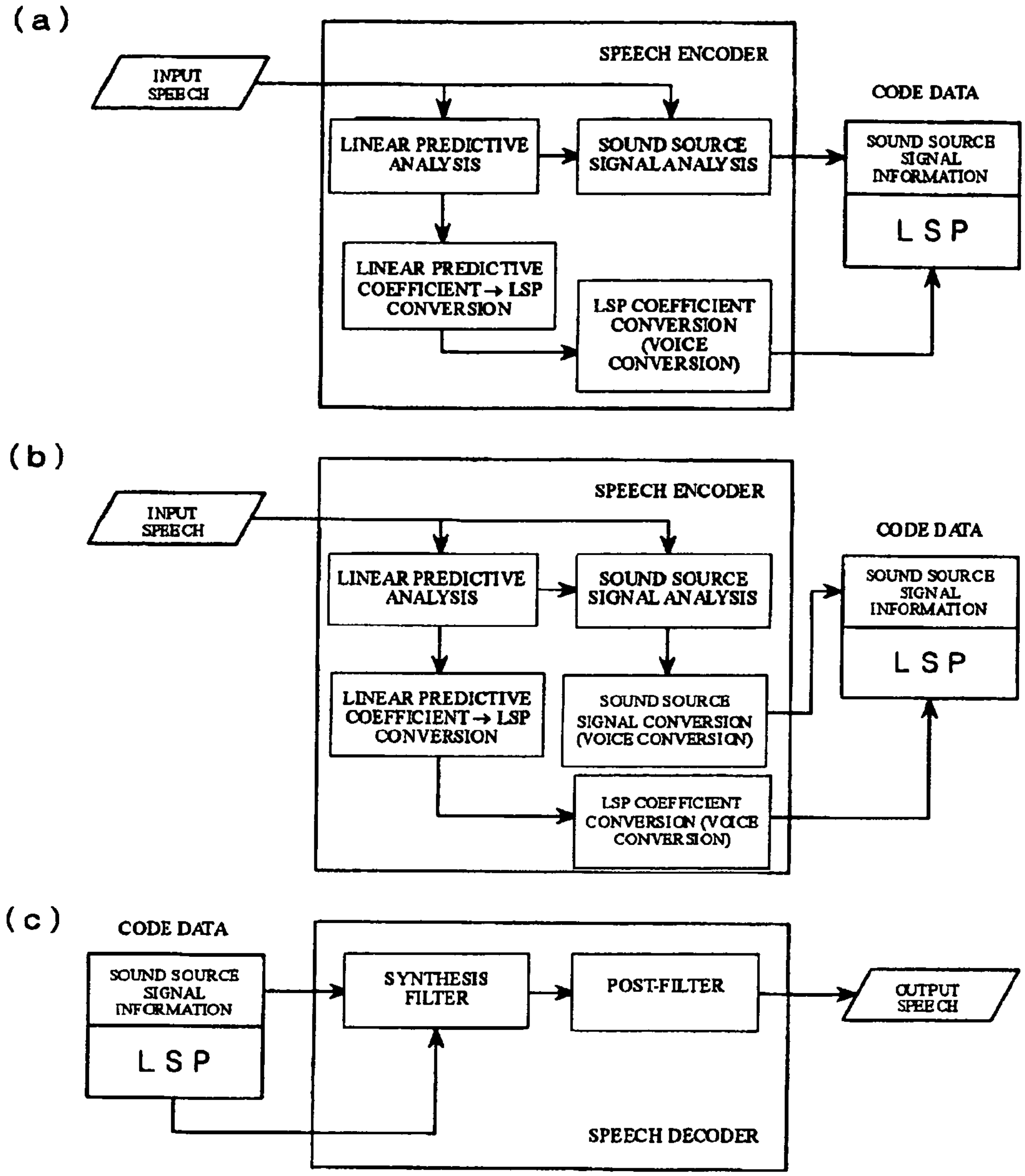

[Figure 20]
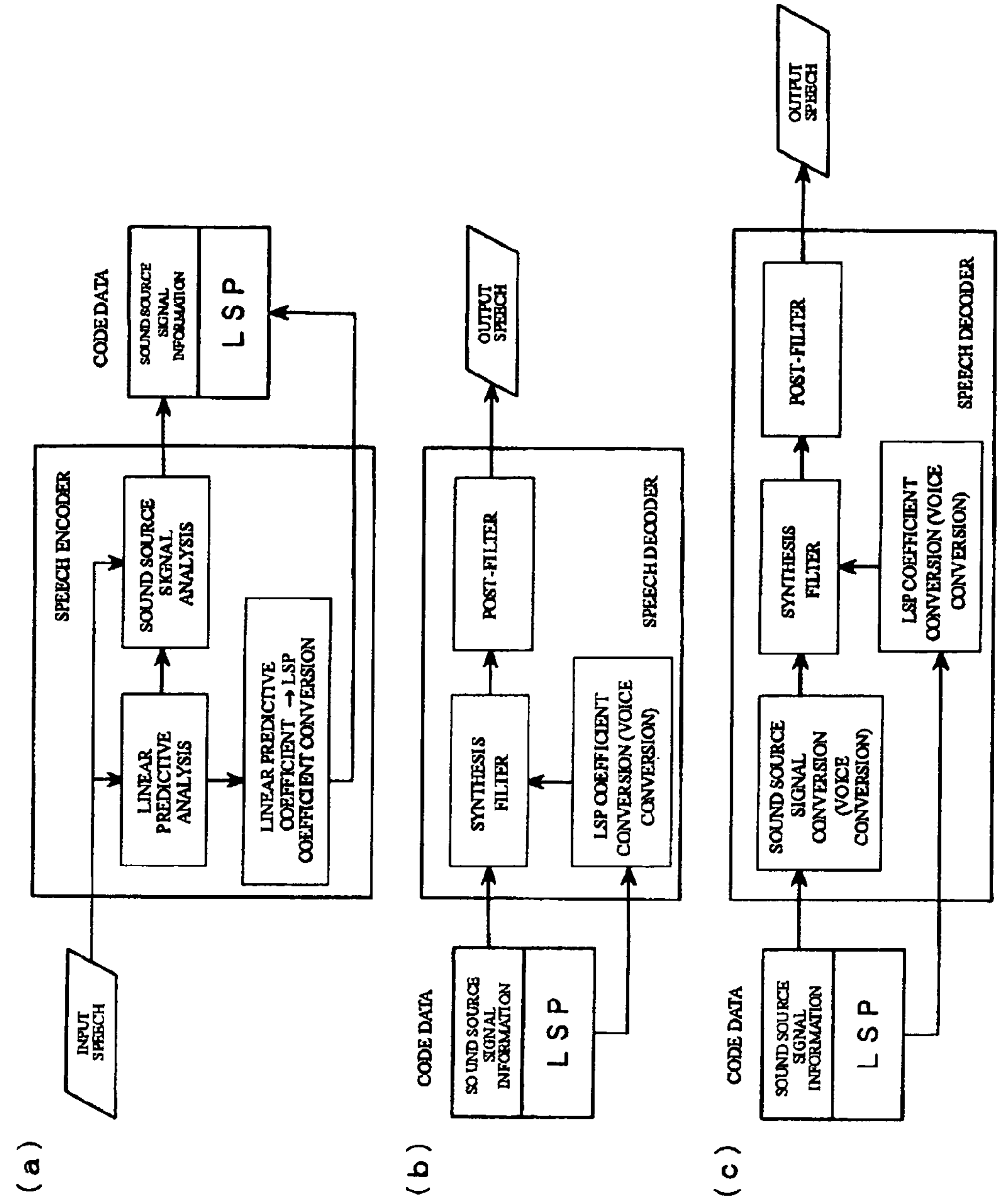

[Figure 21]
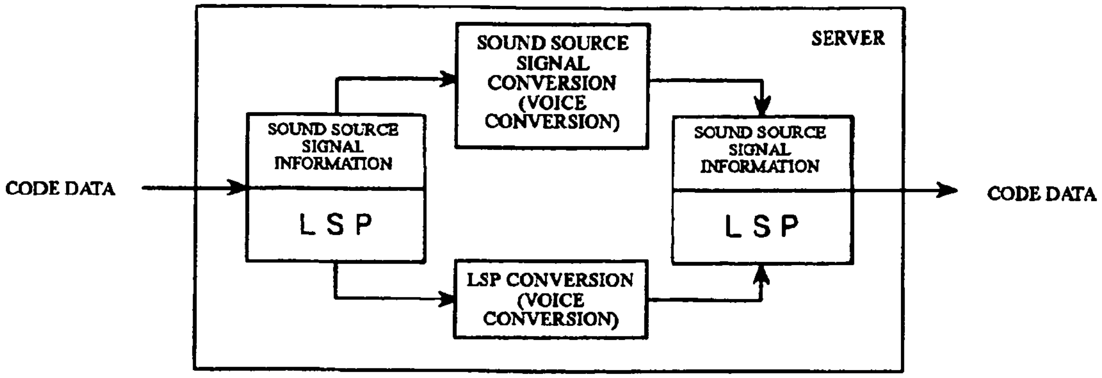

[Figure 22]
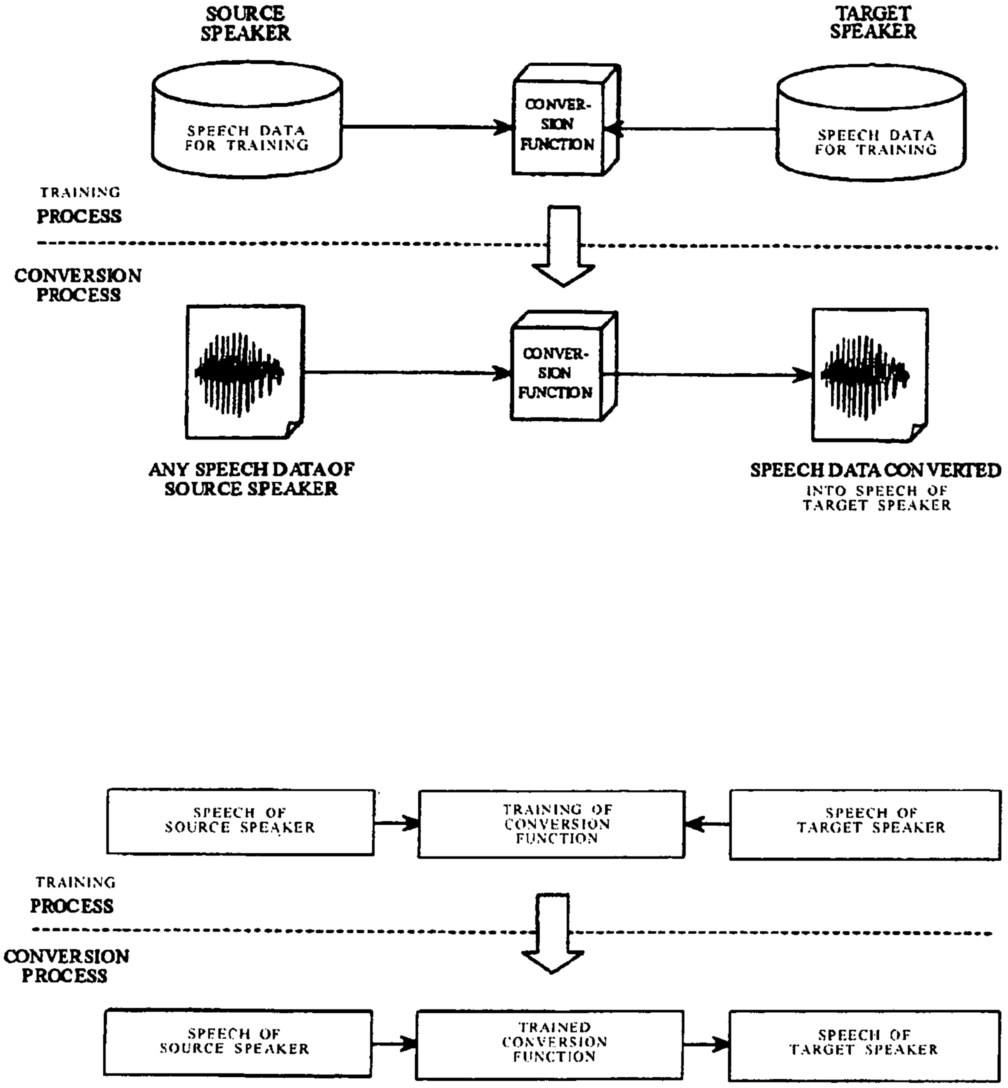

[Figure 23]
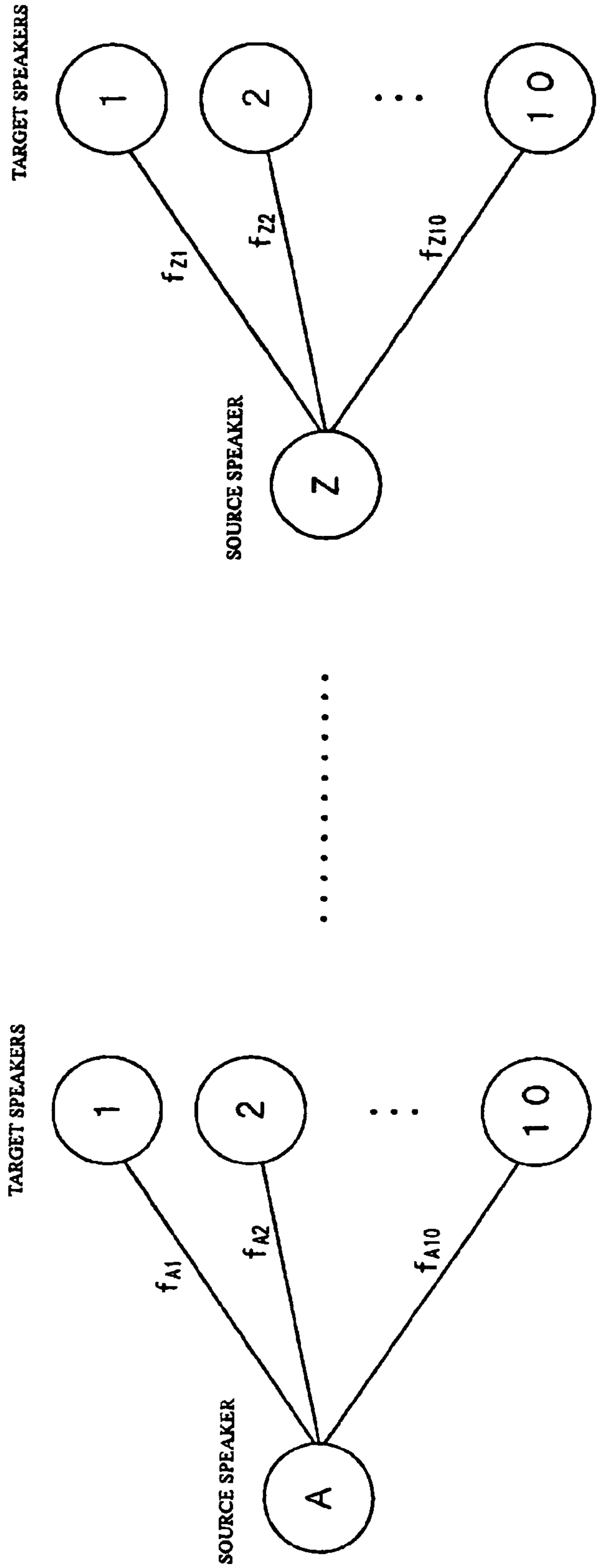

VOICE CONVERSION SYSTEM

TECHNICAL FIELD

The present invention relates to a voice conversion training system, voice conversion system, voice conversion client-server system, and program for converting speech of a source speaker to speech of a target speaker.

BACKGROUND ART

Voice conversion techniques for converting speech of one speaker to speech of another speaker have been known (For example, see Patent Document 1 and Non-Patent Document 1).

FIG. 22 shows a basic process of voice conversion processing. The process of voice conversion processing consists of a training process and a conversion process. In the training process, speech of a source speaker and speech of a target speaker who is a target of conversion are collected and stored as speech data for training. Then, training is performed based on the speech data for training to generate a conversion function for converting speech of the source speaker to speech of the target speaker. In the conversion process, the conversion function generated in the training process is used to convert any speech spoken by the source speaker to speech of the target speaker. The above processing is performed in a computer.

[Patent Document 1] JP-A-2002-215198

[Non-Patent Document 1] Alexander Kain and Michael W. Macon "SPECTRAL VOICE CONVERSION FOR TEXT-TO-SPEECH SYNTHESIS"

DISCLOSURE OF THE INVENTION

Problems to be Solved by the Invention

In order to convert speech of the source speaker to speech of the target speaker in such a voice conversion technique, it is necessary to generate a conversion function unique to the combination of voice characteristic of the source speaker and voice characteristic of the target speaker. Therefore, if a plurality of source speakers and a plurality of target speakers exist and conversion functions for converting speech of each source speakers to speech of each target speakers are generated, training needs to be performed as many times as the number of combinations of the source speakers and the target speakers.

For example, as shown in FIG. 23, if 26 source speakers A, B, . . . , Z and 10 target speakers 1, 2, . . . , 10 exist and conversion functions for converting speech of each source speakers to speech of each target speakers are generated, as many times of training as the number of combinations 260 (=26×10) of the 26 source speakers and the 10 target speakers needs to be performed to generate the conversion functions. When it is desired to put voice conversion into practical use to provide a voice conversion service to source speakers, the load imposed on the computer in training and in generating the conversion functions will increase because the number of conversion functions increases with the number of source speakers and target speakers. In addition, a storage device with a large capacity will be required for storing a large number of generated conversion functions.

Also, as the speech data for training, the source speakers and the target speakers need to record the same utterance of about 50 sentences (which will be referred to as one speech set). If the each of speech sets recorded for the 10 target speakers is different from each other, each source speaker needs to record 10 types of speech sets. Assuming that it takes 30 minutes to record one speech set, each source speaker has to spend as much as five hours on recording the speech data for training.

Further, if the speech of a target speaker is that of an animation character, a famous person, a person who has died, or the like, it is unrealistic in terms of cost or impossible to ask such a person to speak a speech set required for voice conversion and record his/her speech.

The present invention has been made to solve the existing problems as described above and provides a voice conversion training system, voice conversion system, voice conversion client-server system, and program that allow voice conversion to be performed with low load of training.

Means for Solving the Problems

To solve the above-described problems, the present invention provides a voice conversion system that converts speech of a source speaker to speech of a target speaker, including a voice conversion means for converting the speech of the source speaker to the speech of the target speaker via conversion to speech of an intermediate speaker.

According to this invention, the voice conversion system converts the speech of the source speaker to the speech of the target speaker via conversion to the speech of the intermediate speaker. Therefore, when a plurality of source speakers and a plurality of target speakers exist, only conversion functions to convert speech of each of the source speakers to the speech of the intermediate speaker and conversion functions to convert the speech of the intermediate speaker to speech of each of the target speakers need to be, provided to be able to convert speech of each of the source speakers to speech of each of the target speakers. Since fewer conversion functions are required than in the case where speech of each of the source speakers is directly converted into speech of each of the target speakers as conventional, voice conversion can be performed using the conversion functions generated with low load of training.

The present invention provides a voice conversion training system that trains functions to convert speech of each of one or more source speakers to speech of each of one or more target speakers, including: an intermediate conversion function generation means for training and generating an intermediate conversion function to convert the speech of the source speaker to speech of one intermediate speaker commonly provided for each of the one or more source speakers; and a target conversion function generation means for training and generating a target conversion function to convert the speech of the intermediate speaker to the speech of the target speaker.

According to this invention, the voice conversion training system trains and generates the intermediate conversion function to convert speech of each of the one or more source speakers to speech of the one intermediate speaker, and the target conversion function to convert the speech of the one intermediate speaker to speech of each of the one or more target speakers. Therefore, when a plurality of source speakers and a plurality of target speakers exist, fewer conversion functions are required to be generated than in the case where speech of each of the source speakers is directly converted to speech of each of the target speakers, so that training of voice conversion functions can be performed with low load. Thus, the speech of the source speakers can be converted to the speech of the target speakers using the intermediate conversion functions and the target conversion functions generated with low load of training.

The present invention provides the voice conversion training system, wherein the target conversion function generation means generates, as the target conversion function, a function to convert converted speech of the source speaker by using the intermediate conversion function, to the speech of the target speaker.

In actual situation when voice conversion is performed, converted speech of the source speaker by using the intermediate conversion function is generated as speech of the intermediate speaker, and speech of the target speaker is generate from this converted speech by using the target conversion function. Therefore, according to this invention, the accuracy of voice characteristic in the voice conversion will be higher than in the case where a function which converts the actual recorded speech of the intermediate speaker to speech of the target speaker is generated as the target conversion function.

The present invention provides the voice conversion training system, wherein the speech of the intermediate speaker is speech synthesized from a speech synthesis device that synthesizes any utterance with a predetermined voice characteristic.

According to this invention, speech of the intermediate speaker used for the training is speech synthesized from the speech synthesis device, so that the same utterance as that of the source speaker and the target speaker can be easily synthesized from the speech synthesis device. Since no constraint is imposed on the utterance of the source speaker and the target speaker in the training, convenience for use is improved.

The present invention provides the voice conversion training system, wherein the speech of the source speaker is speech synthesized from a speech synthesis device that synthesizes any utterance with a predetermined characteristic.

According to this invention, speech of the source speaker used for the training is speech synthesized from the speech synthesis device, so that the same utterance as that of the target speaker can be easily synthesized from the speech synthesis device. Since no constraint is imposed on the utterance of the target speaker in the training, convenience for use is improved. For example, when speech of an actor recorded from a movie is used as speech of the target speaker, the training can be performed easily even though limited recorded speech is available.

The present invention provides the voice conversion training system, further including a conversion function composition means for generating a function to convert the speech of the source speaker to the speech of the target speaker by composing the intermediate conversion function generated by the intermediate conversion function generation means and the target conversion function generated by the target conversion function generation means.

According to this invention, the use of the composed function reduces the computation time required to convert the speech of the source speaker to the speech of the target speaker compared with the use of the intermediate conversion function and the target conversion function. In addition, the size of memory used in voice conversion processing can be reduced.

The present invention provides a voice conversion system including a voice conversion means for converting the speech of the source speaker to the speech of the target speaker using the functions generated by the voice conversion training system.

According to this invention, the voice conversion system can convert the speech of each of the one or more source speakers to the speech of each of the or more target speakers using the functions generated with low load of training.

The present invention provides the voice conversion system, wherein the voice conversion means includes: an intermediate voice conversion means for generating the speech of the intermediate speaker from the speech of the source speaker by using the intermediate conversion function; and a target voice conversion means for generating the speech of the target speaker from the speech of the intermediate speaker generated by the intermediate voice conversion means by using the target conversion function.

According to this invention, the voice conversion system can convert each speech of the source speakers to each speech of the target speakers using fewer conversion functions than in a conventional case.

The present invention provides the voice conversion system, wherein the voice conversion means converts the speech of the source speaker to the speech of the target speaker by using a composed function of the intermediate conversion function and the target conversion function.

According to this invention, the voice conversion system can use the composed function of the intermediate conversion function and the target conversion function to convert the speech of the source speaker to the speech of the target speaker speech. Therefore, the computation time required for converting the speech of the source speaker to the speech of the target speaker is reduced compared with the case where the intermediate conversion function and the target conversion function are used. In addition, the size of memory used in voice conversion processing can be reduced.

The present invention provides the voice conversion system, wherein the voice conversion means converts a spectral sequence that is a feature parameter of speech.

According to this invention, voice conversion can be performed easily by converting code data transmitted from an existing speech encoder to a speech decoder.

The present invention provides a voice conversion client-server system that converts speech of each of one or more users to speech of each of one or more target speakers, in which a client computer and a server computer are connected with each other over a network, wherein the client computer includes: a user's speech acquisition means for acquiring the speech of the user; a user's speech transmission means for transmitting the speech of the user acquired by the user's speech acquisition means to the server computer; an intermediate conversion function reception means for receiving from the server computer an intermediate conversion function to convert the speech of the user to speech of one intermediate speaker commonly provided for each of the one or more users; and a target conversion function reception means for receiving from the server computer a target conversion function to convert the speech of the intermediate speaker to the speech of the target speaker, wherein the server computer includes: a user's speech reception means for receiving the speech of the user from the client computer; an intermediate speaker's speech storage means for storing the speech of the intermediate speaker in advance; an intermediate conversion function generation means for generating the intermediate conversion function to convert the speech of the user to the speech of the intermediate speaker; a target speaker's speech storage means for storing the speech of the target speaker in advance; a target conversion function generation means for generating the target conversion function to convert the speech of the intermediate speaker to the speech of the target speaker; an intermediate conversion function transmission means for transmitting the intermediate conversion function to the client computer; and a target conversion function transmission means for transmitting the target conversion function to the client computer, and wherein the client computer further includes: an intermediate voice conversion means for generating the speech of the intermediate speaker from the speech of the user by using the intermediate conversion function; and a target voice conversion means for generating the speech of the target speaker from the speech of the intermediate speaker by using the target conversion function.

According to this invention, the server computer generates the intermediate conversion function for the user and the target conversion function, and the client computer receives the intermediate conversion function and the target conversion function from the server computer. Therefore, the client computer can convert the speech of the user to the speech of the target speaker.

The present invention provides a program for causing a computer to perform at least one of: an intermediate conversion function generation step of generating each intermediate conversion function to convert speech of each of one or more source speakers to speech of one intermediate speaker; and a target conversion function generation step of generating each target conversion function to convert the speech of the one intermediate speaker to speech of each of one or more target speakers.

According to this invention, the program can be stored in one or more computers to allow generation of the intermediate conversion function and the target conversion function for use in voice conversion.

The present invention provides a program for causing a computer to perform: a conversion function acquisition step of acquiring an intermediate conversion function to convert speech of a source speaker to speech of an intermediate speaker and a target conversion function to convert the speech of the intermediate speaker to speech of a target speaker; an intermediate voice conversion step of generating the speech of the intermediate speaker from the speech of the source speaker by using the intermediate conversion function acquired in the conversion function acquisition step; and a target voice conversion step of generating the speech of the target speaker from the speech of the intermediate speaker generated in the intermediate voice conversion step by using the target conversion function acquired in the conversion function acquisition step.

According to this invention, the program can be stored in a computer to allow the computer to convert the speech of the source speaker to the speech of the target speaker via conversion to the speech of the intermediate speaker.

Advantages of the Invention

According to the present invention, the voice conversion training system trains and generates each intermediate conversion function to convert speech of each of one or more source speakers to speech of one intermediate speaker, and each target conversion function to convert the speech of the one intermediate speaker to speech of each of one or more target speakers. Therefore, when a plurality of source speakers and a plurality of target speakers exist, fewer conversion functions are required to be generated than in the case where speech of each of the source speakers is directly converted to speech of each of the target speakers as conventional, so that voice conversion training can be performed with low load. The voice conversion system can convert speech of the source speaker to speech of the target speaker using the functions generated by the voice conversion training system.

BRIEF DESCRIPTION OF THE DRAWINGS

FIG. 1 is a diagram showing the configuration of a voice training and conversion system according to an embodiment of the present invention;

FIG. 2 is a diagram showing components of a server according to the embodiment;

FIG. 3 is a diagram for showing the procedure of converting speech of a source speaker x to speech of a target speaker y using a conversion function Hy(x) generated by composing a conversion function F(x) and a conversion function Gy(i) instead of using the conversion function F(x) and the conversion function Gy(i);

FIG. 4 is graphs for showing examples of w1(*f*), w2(*f*), and w'(f) according to the embodiment;

FIG. 5 is a diagram showing the functional configuration of a mobile terminal according to the embodiment;

FIG. 6 is a diagram for describing the number of conversion functions necessary for voice conversion from each source speaker to each target speaker according to the embodiment;

FIG. 7 is a flowchart showing the flow of processing of training and storing the conversion function Gy(i) in the server according to the embodiment;

FIG. 8 is a flowchart showing the procedure of obtaining the conversion function F for the source speaker x in the mobile terminal according to the embodiment;

FIG. 9 is a flowchart showing the procedure of voice conversion processing in the mobile terminal according to the embodiment;

FIG. 10 is a flowchart for describing a first pattern of conversion function generation processing and voice conversion processing where the conversion functions are trained in a conversion mode which uses converted feature parameter according to the embodiment;

FIG. 11 is a flowchart for describing a second pattern of conversion function generation processing and voice conversion processing where the conversion functions are trained in the conversion mode which uses converted feature parameter according to the embodiment;

FIG. 12 is a flowchart for describing a third pattern of conversion function generation processing and voice conversion processing where the conversion functions are trained in the conversion mode which uses converted feature parameter according to the embodiment;

FIG. 13 is a flowchart for describing a fourth pattern of conversion function generation processing and voice conversion processing where the conversion functions are trained in the conversion mode which uses converted feature parameter according to the embodiment;

FIG. 14 is a flowchart for describing a first pattern of conversion function generation processing and voice conversion processing where the conversion functions are trained in a conversion mode which uses unconverted feature parameter according to the embodiment;

FIG. 15 is a flowchart for describing a second pattern of conversion function generation processing and voice conversion processing where the conversion functions are trained in the conversion mode which uses unconverted feature parameter according to the embodiment;

FIG. 16 is a flowchart for describing a third pattern of conversion function generation processing and voice conversion processing where the conversion functions are trained in the conversion mode which uses unconverted feature parameter according to the embodiment;

FIG. 17 is a graph for comparing cepstrum distortions in the method according to the embodiment and a conventional method;

FIG. 18 is a flowchart showing the procedure of generating the conversion function F in the mobile terminal where the mobile terminal includes an intermediate conversion function generation unit according to a variation example;

FIG. 19 is a diagram showing an exemplary processing pattern of performing voice conversion on speech input to a transmitting mobile phone and outputting the speech from a receiving mobile phone, where the voice conversion is performed in the transmitting mobile phone, according to a variation example;

FIG. 20 is a diagram showing an exemplary processing pattern of performing voice conversion on speech input to a transmitting mobile phone and outputting the speech from a receiving mobile phone, where the voice conversion is performed in the receiving mobile phone, according to a variation example;

FIG. 21 is a diagram showing an exemplary processing pattern of performing voice conversion in the server according to a variation example;

FIG. 22 is a diagram showing a basic process of conventional voice conversion processing; and FIG. 23 is a diagram for describing a conventional example of the number of conversion functions necessary to convert speech of source speakers to speech of target speakers.

DESCRIPTION OF SYMBOLS

1 voice conversion client-server system
10 server
101 intermediate conversion function generation unit
102 target conversion function generation unit
20 mobile terminal
21 voice conversion unit
211 intermediate voice conversion unit
212 target voice conversion unit

BEST MODE FOR CARRYING OUT THE INVENTION

With reference to the drawings, embodiments according to the present invention will be described below.

FIG. 1 is a diagram showing the configuration of a voice conversion client-server system 1 according to an embodiment of the present invention.

As shown, the voice conversion client-server system 1 according to this embodiment of the present invention includes a server (corresponding to a "voice conversion training system") 10 and a plurality of mobile terminals (corresponding to "voice conversion systems") 20. The server 10 trains and generates a conversion function to convert speech of a user having a mobile terminal 20 to speech of a target speaker. The mobile terminal 20 obtains the conversion function from the server 10 and converts speech of the user to speech of the target speaker based on the conversion function. Speech herein represents a waveform, a parameter sequence extracted from the waveform in some method, or the like.

(Functional Configuration of Server)

Now, components of the server 10 will be described. As shown in FIG. 2, the server 10 includes an intermediate conversion function generation unit 101 and a target conversion function generation unit 102. Their functionality is realized by a CPU which is mounted in the server 10 and performs processing based on a program stored in a storage device.

The intermediate conversion function generation unit 101 performs training based on speech of a source speaker and speech of an intermediate speaker, thereby generating a conversion function F (corresponding to an "intermediate conversion function") to convert speech of the source speaker to speech of the intermediate speaker. Here, the same set of about 50 sentences (one speech set) is spoken by the source speaker and the intermediate speaker and recorded in advance to be used as speech of the source speaker and speech of the intermediate speaker. There is only one intermediate speaker (a predetermined voice characteristic). When a plurality of source speakers exist, the training is performed between speech of each of the plurality of source speakers and speech of the one intermediate speaker. In other words, one common intermediate speaker is provided for each of one or more source speakers. As an exemplary training technique, a feature parameter conversion method based on a Gaussian Mixture Model (GMM) may be used. Any other well-known methods may also be used.

The target conversion function generation unit 102 generates a conversion function G (corresponding to a "target conversion function") to convert speech of the intermediate speaker to speech of a target speaker.

Here, there are two types of modes in which the target conversion function generation unit 102 trains the conversion function G. A first training mode performs training of the relationship between converted feature parameter of the recorded speech of source speaker by using the conversion function F and the feature parameter of the recorded speech of target speaker. This first conversion mode will be referred to as a "conversion mode which uses converted feature parameter". In actual situation when voice conversion is performed, speech of the source speaker is converted using the conversion function F, and the conversion function G is applied to this converted speech in order to generate speech of the target speaker. Therefore, in this mode, training can be performed by taking into account of the procedure in actual voice conversion.

A second training mode performs training of the relationship between the feature parameter of the recorded speech of intermediate speaker and the feature parameter of the recorded speech of target speaker without taking into account of the procedure in actual voice conversion. This second conversion mode will be referred to as an "conversion mode which uses unconverted feature parameter".

The conversion functions F and G may each be represented not only in the form of an equation but also in the form of a conversion table.

A conversion function composition unit 103 composes the conversion function F generated by the intermediate conversion function generation unit 101 and the conversion function G generated by the target conversion function generation unit 102, thereby generating a function to convert speech of the source speaker to speech of the target speaker.

FIG. 3 is a diagram showing the procedure of converting speech of a source speaker x to speech of a target speaker y using a conversion function Hy(x) generated by composing a conversion function F(x) and a conversion function Gy(i) (FIG. 3(*b*)) instead of converting the speech of the source speaker x to the speech of the target speaker y using the conversion function F(x) and the conversion function Gy(i) (FIG. 3(*a*)). Compared with the use of the conversion function F(x) and the conversion function Gy(i), the use of the conversion function Hy(x) reduces by about half the computation time required for converting the speech of the source speaker x to the speech of the target speaker y. In addition, since the feature parameter of speech of the intermediate speaker is not generated, the size of memory used in voice conversion processing can be reduced.

Description will be given below of the fact that the conversion function F and the conversion function G can be composed to generate a function for converting speech of a source speaker to speech of a target speaker. As a specific example, the case where the feature parameter is a spectral parameter will be described. When a function for the spectral parameter is represented as a linear function, where f is the frequency, conversion from an unconverted spectrum s(f) to a converted spectrum s'(f) is represented as $$s'(f)=s(w(f)),$$

where w( ) is a function representing frequency conversion. Let w1( ) be frequency conversion from the source speaker to the intermediate speaker, w2( ) be frequency conversion from the intermediate speaker to the target speaker, s(f) be spectrum of speech of the source speaker, s'(f) be spectrum of speech of the intermediate speaker, and s"(f) be spectrum of speech of the target speaker. Then, $$s'(f)=s(w1(f)) \text{ and}$$

$$s''(f)=s'(w2(f)).$$

For example, as shown in FIG. 4, let $$w1(f)=f/2 \text{ and}$$

$$w2(f)=2f+5,$$

where the composed function of w1(*f*) and w2(*f*) is represented as w'(f). Then, $$w'(f)=2(f/2)+5=f+5.$$

As a result, it is possible to represent as $$s''(f)=s(w'(f)).$$

From this, it can be seen that the conversion function F and the conversion function G can be composed to generate a function for converting speech of a source speaker to speech of a target speaker.

(Functional Configuration of Mobile Terminal)

Now, the functional configuration of the mobile terminal 20 will be described. The mobile terminal 20 may be a mobile phone, for example. Besides a mobile phone, the mobile terminal 20 may be a personal computer with a microphone connected thereto. FIG. 5 shows the functional configuration of the mobile terminal 20. This functional configuration is implemented by a CPU which is mounted in the mobile terminal 20 and performs processing based on a program stored in nonvolatile memory. As shown, the mobile terminal 20 includes a voice conversion unit 21. As an exemplary voice conversion technique, the voice conversion unit 21 performs voice conversion by converting a spectral sequence or by converting both a spectral sequence and a sound source signal. Cepstral coefficients, LSP (Line Spectral Pair) coefficients, or the like may be used as the spectral sequence. By performing voice conversion not only on the spectral sequence but also on the sound source signal, speech closer to speech of the target speaker can be obtained.

The voice conversion unit 21 consists of an intermediate voice conversion unit 211 and a target voice conversion unit 212.

The intermediate voice conversion unit 211 uses the conversion function F to convert speech of the source speaker to speech of the intermediate speaker.

The target voice conversion unit 212 uses the conversion function G to convert speech of the intermediate speaker resulting from the conversion in the intermediate voice conversion unit 211 to speech of the target speaker.

In this embodiment, the conversion functions F and G are generated in the server 10 and downloaded to the mobile terminal 20.

FIG. 6 is a diagram for describing the number of conversion functions necessary for voice conversion from each source speaker to each target speaker when there are source speakers A, B, . . . , Y, and Z, an intermediate speaker i, and target speakers 1, 2, . . . , 9, and 10.

As shown, 26 types of conversion functions F, i.e., F(A), F(B), . . . , F(Y), and F(Z) are necessary to be able to convert speech of each of the source speakers A, B, . . . , Y, and Z to speech of the intermediate speaker i. Also, 10 types of conversion functions G, i.e., G1(*i*), G2(*i*), . . . , G9(*i*), and G10(*i*) are necessary to be able to convert the speech of the intermediate speaker i to speech of each of the target speakers 1, 2, . . . , 9, and 10. Therefore, 26+10=36 types of conversion functions are necessary in total. In contrast, 260 types of conversion functions are necessary in the conventional example, as described above. Thus, this embodiment allows a significant reduction in the number of conversion functions.

(Processing of Training and Storing of Conversion Function G in Server)

Now, with reference to FIG. 7, processing of training and storing of the conversion function Gy(i) in the server 10 will be described.

Here, a source speaker x and an intermediate speaker i are persons or TTSs (Text-to-Speech) and prepared by a vendor that owns the server 10. The TTS is a well-known device that converts any text (characters) to corresponding speech and generates the speech in a predetermined voice characteristic.

FIG. 7(*a*) shows the procedure of training of the conversion function G in the conversion mode which uses converted feature parameter.

As shown, the intermediate conversion function generation unit 101 first performs training based on speech of the source speaker x, as well as speech of the intermediate speaker i obtained and stored (corresponding to "intermediate speaker's speech storage means") in advance in a storage device, and generates the conversion function F(x). The intermediate conversion function generation unit 101 outputs speech x' resulting from converting the speech of the source speaker x by using the conversion function F(x) (step S101).

The target conversion function generation unit 102 then performs training based on the converted speech x', as well as speech of a target speaker y obtained and stored (corresponding to "target speaker's speech storage means") in advance in a storage device, and generates the conversion function Gy(i) (step S102). The target conversion function generation unit 102 stores the generated conversion function Gy(i) in a storage device provided in the server 10 (step S103).

FIG. 7(*b*) shows the procedure of training of the conversion function G in the conversion mode which uses unconverted feature parameter.

As shown, the target conversion function generation unit 102 performs training based on the speech of the intermediate speaker i and the speech of the target speaker y and generates the conversion function Gy(i) (step S201). The target conversion function generation unit 102 stores the generated conversion function Gy(i) in the storage device provided in the server 10 (step S202).

While conventionally it has been necessary to perform training in the server 10 as many times as the number of source speakers x the number of target speakers, this embodiment only requires as many times of training as the number of intermediate speaker (one)×the number of target speakers. Therefore, fewer conversion functions G are generated. This reduces the processing load of training and also makes management of the conversion functions G easy.

(Process of Obtaining Conversion Function F in Mobile Terminal)

Now, with reference to FIG. 8, the procedure of obtaining the conversion function F(x) for the source speaker x in the mobile terminal 20 will be described.

FIG. 8(*a*) shows the procedure where speech of a person is used as the speech of the intermediate speaker i.

As shown, the source speaker x first speaks to the mobile terminal 20. The mobile terminal 20 collects the speech of the source speaker x with a microphone (corresponding to "user's speech acquisition means") and transmits the speech to the server 10 (corresponding to "user's speech transmission means") (step S301). The server 10 receives the speech of the source speaker x (corresponding to "user's speech reception means"). The intermediate conversion function generation unit 101 performs training based on the speech of the source speaker x and the speech of the intermediate speaker i and generates the conversion function F(x) (step S302). The server 10 transmits the generated conversion function F(x) to the mobile terminal 20 (corresponding to "intermediate conversion function transmission means") (step S303).

FIG. 8(*b*) shows the procedure where speech generated from a TTS is used as the speech of the intermediate speaker i.

As shown, the source speaker x first speaks to the mobile terminal 20. The mobile terminal 20 collects the speech of the source speaker x with the microphone and transmits the speech to the server 10 (step S401).

The utterance of the speech of the source speaker x received by the server 10 is converted to text by a speech recognition device or manually (step S402), and the text is input to the TTS (step S403). The TTS generates the speech of the intermediate speaker i (TTS) based on the input text and outputs the generated speech (step S404).

The intermediate conversion function generation unit 101 performs training based on the speech of the source speaker x and the speech of the intermediate speaker i and generates the conversion function F(x) (step S405). The server 10 transmits the generated conversion function F(x) to the mobile terminal 20 (step S406).

The mobile terminal 20 stores the received conversion function F(x) in the nonvolatile memory. Once the conversion function F(x) is stored in the mobile terminal 20, the source speaker x can download a desired conversion function G from the server 10 to the mobile terminal 20 (corresponding to "target conversion function transmission means" and "target conversion function reception means") to convert speech of the source speaker x to speech of a desired target speaker, as shown in FIG. 1. Conventionally, the source speaker x has needed to speak the same utterance as that of the speech set of each target speaker and obtain each conversion function unique to each target speaker. In this embodiment, the source speaker x only needs to speak one speech set and obtain one conversion function F(x). This reduces the load on the source speaker x.

(Voice Conversion Processing)

Now, with reference to FIG. 9, the procedure for the mobile terminal 20 to perform voice conversion will be described. It is assumed that the conversion function F(A) for converting speech of a source speaker A to speech of the intermediate speaker, and the conversion function G for converting the speech of the intermediate speaker to speech of a target speaker y, have been downloaded from the server 10 and stored in the nonvolatile memory of the mobile terminal 20.

The speech of the source speaker A is first input to the mobile terminal 20. The intermediate voice conversion unit 211 uses the conversion function F(A) to convert the speech of the source speaker A to the speech of the intermediate speaker (step S501). The target voice conversion unit 212 then uses the conversion function Gy(i) to convert the speech of the intermediate speaker to the speech of the target speaker y (step S502) and outputs the speech of the target speaker y (step S503). Here, for example, the output speech may be transmitted via a communication network to a mobile terminal of a party with whom the source speaker A is communicating, and the speech may be output from a speaker provided in that mobile terminal. The speech may also be output from a speaker provided in the mobile terminal 20 so that the source speaker A can check the converted speech.

(Various Processing Patterns of Conversion Function Generation Processing and Voice Conversion Processing)

Now, with reference to FIGS. 10 to 16, various processing patterns of conversion function generation processing and voice conversion processing will be described.

[1] Conversion Mode which Uses Converted Feature Parameter

First, the case where the conversion functions are trained in the conversion mode which uses converted feature parameter will be described.

(1) FIG. 10 shows a training process and a conversion process in the case where recorded speech of the intermediate speaker for use in the training consists of one set (set A) of speech.

The intermediate conversion function generation unit 101 first performs training based on the speech set A of a source speaker Src.1 and the speech set A of the intermediate speaker In. and generates a conversion function F(Src.1(A)) (step S1101).

Similarly, the intermediate conversion function generation unit 101 performs training based on the speech set A of a source speaker Src.2 and the speech set A of the intermediate speaker In. and generates a conversion function F(Src.2(A)) (step S1102).

The target conversion function generation unit 102 then converts the speech set A of the source speaker Src.1 by using the conversion function F(Src.1(A)) generated in step S1101 and generates a converted Tr. set A (step S1103). The target conversion function generation unit 102 performs training based on the converted Tr. set A and the speech set A of a target speaker Tag.1 and generates a conversion function G1(Tr.(A)) (step S1104).

Similarly, the target conversion function generation unit 102 performs training based on the converted Tr. set A and the speech set A of a target speaker Tag.2 and generates a conversion function G2(Tr.(A)) (step S1105).

In the conversion process, the intermediate voice conversion unit 211 uses the conversion function F(Src.1(A)) generated in the training process to convert any speech of the source speaker Src.1 to speech of the intermediate speaker In. (step S1107). The target voice conversion unit 212 then uses the conversion function G1(Tr.(A)) or the conversion function G2(Tr.(A)) to convert the speech of the intermediate speaker In. to speech of the target speaker Tag.1 or the target speaker Tag.2 (step S1108).

Similarly, the intermediate voice conversion unit 211 uses the conversion function F(Src.2(A)) to convert any speech of the source speaker Src.2 to speech of the intermediate speaker In. (step S1109). The target voice conversion unit 212 then uses the conversion function G1(Tr.(A)) or the conversion function G2(Tr.(A)) to convert the speech of the intermediate speaker In. to speech of the target speaker Tag.1 or the target speaker Tag.2 (step S1110).

Thus, when only one set (set A) is used for speech of the intermediate speaker in the training, the utterance of the source speakers and the target speakers also need to be the same set A. However, compared with the conventional example, the number of conversion functions to be generated can be reduced.

(2) FIG. 11 shows a training process and a conversion process in the case where speech of the intermediate speaker consists of a plurality of sets (set A and set B) of speech spoken by a TTS or a person.

The intermediate conversion function generation unit 101 first performs training based on the speech set A of a source speaker Src.1 and the speech set A of the intermediate speaker In. and generates a conversion function F(Src.1(A)) (step S1201).

Similarly, the intermediate conversion function generation unit 101 performs training based on the speech set B of a source speaker Src.2 and the speech set B of the intermediate speaker In. and generates a conversion function F(Src.2(B)) (step S1202).

The target conversion function generation unit 102 then converts the speech set A of the source speaker Src.1 by using the conversion function F(Src.1(A)) generated in step S1201 and generates a converted Tr. set A (step S1203). The target conversion function generation unit 102 performs training based on the converted Tr. set A and the speech set A of a target speaker Tag.1 and generates a conversion function G1(Tr.(A)) (step S1204).

Similarly, the target conversion function generation unit 102 converts the speech set B of the source speaker Src.2 by using the conversion function F(Src.2(B)) generated in step S1202 and generates a converted Tr. set B (step S1205). The target conversion function generation unit 102 performs training based on the converted Tr. set B and the speech set B of a target speaker Tag.2 and generates a conversion function G2(Tr.(B)) (step S1206).

In the conversion process, the intermediate voice conversion unit 211 uses the conversion function F(Src.1(A)) to convert any speech of the source speaker Src.1 to speech of the intermediate speaker In. (step S1207). The target voice conversion unit 212 then uses the conversion function G1(Tr.(A)) or the conversion function G2(Tr.(B)) to convert the speech of the intermediate speaker In. to speech of the target speaker Tag.1 or the target speaker Tag.2 (step S1208).

Similarly, the intermediate voice conversion unit 211 uses the conversion function F(Src.2(B)) to convert any speech of the source speaker Src.2 to speech of the intermediate speaker In. (step S1209). The target voice conversion unit 212 then uses the conversion function G1(Tr.(A)) or the conversion function G2(Tr.(B)) to convert the speech of the intermediate speaker In. to speech of the target speaker Tag.1 or the target speaker Tag.2 (step S1210).

In this pattern, the utterance of the source speakers and the target speakers in the training need to be the same (for the set A pair and the set B pair, respectively). However, if the intermediate speaker is a TTS, it is possible to let the intermediate speaker speak the same utterance as the source speakers and the target speakers. Therefore, only the utterance of the source speakers and the target speakers need to match, so that convenience for use in the training is improved. In addition, if the intermediate speaker is a TTS, speech of the intermediate speaker can be semipermanently provided.

(3) FIG. 12 shows a training process and a conversion process in the case where part of speech of source speakers used for the training consists of a plurality of sets (set A, set B, and set C) of speech spoken by a TTS or a person, and speech of the intermediate speaker consists of one set (set A) of speech.

Based on the speech set A of a source speaker and the speech set A of the intermediate speaker In., the intermediate conversion function generation unit 101 first generates a conversion function F(TTS(A)) to convert speech of the source speaker to the speech of the intermediate speaker In. (step S1301).

The target conversion function generation unit 102 then converts the speech set B of the source speaker by using the generated conversion function F(TTS(A)) and generates a converted Tr. set B (step S1302). The target conversion function generation unit 102 then performs training based on the converted Tr. set B and the speech set B of a target speaker Tag.1 and generates a conversion function G1(Tr.(B)) to convert the speech of the intermediate speaker In. to the speech of the target speaker Tag.1 (step S1303).

Similarly, the target conversion function generation unit 102 converts the speech set C of the source speaker by using the generated conversion function F(TTS(A)) and generates a converted Tr. set C (step S1304).

The target conversion function generation unit 102 then performs training based on the converted Tr. set C and the speech set C of the target speaker Tag. 2 and generates a conversion function G2(Tr.(C)) to convert the speech of the intermediate speaker In. to the speech of the target speaker Tag.2 (step S1305).

Based on the speech set A of a source speaker Src.1 and the speech set A of the intermediate speaker In., the intermediate conversion function generation unit 101 generates a conversion function F(Src.1(A)) to convert the speech of the source speaker Src.1 to the speech of the intermediate speaker In. (step S1306).

Similarly, based on the speech set A of the source speaker Src. 2 and the speech set A of the intermediate speaker In., the intermediate conversion function generation unit 101 generates a conversion function F(Src.2(A)) to convert the speech of the source speaker Src.2 to the speech of the intermediate speaker In. (step S1307).

In the conversion process, the intermediate voice conversion unit 211 uses the conversion function F(Src.1(A)) to convert any speech of the source speaker Src.1 to speech of the intermediate speaker In. (step S1308). The target voice conversion unit 212 then uses the conversion function G1(Tr.(B)) or the conversion function G2(Tr.(C)) to convert the speech of the intermediate speaker In. to speech of the target speaker Tag.1 or the target speaker Tag.2 (step S1309).

Similarly, the intermediate voice conversion unit 211 uses the conversion function F(Src.2(A)) to convert any speech of the source speaker Src.2 to speech of the intermediate speaker In. (step S1310). The target voice conversion unit 212 then uses the conversion function G1(Tr.(B)) or the conversion function G2(Tr.(C)) to convert the speech of the intermediate speaker In. to speech of the target speaker Tag.1 or the target speaker Tag.2 (step S1311).

Thus, in this pattern, the utterance of the intermediate speaker and the target speakers can be nonparallel corpuses. If a TTS is used as a source speaker, the utterance of the TTS as the source speaker can be flexibly varied to match the utterance of a target speaker. This allows flexible training of the conversion functions. Since the utterance of the intermediate speaker In. consists of only one set (set A), the utterance spoken by the source speakers Src.1 and Src.2 having the mobile terminals 20 to obtain the conversion function F for performing voice conversion need to be the set A, which is the same as the utterance of the intermediate speaker In.

(4) FIG. 13 shows a training process and a conversion process in the case where part of speech of source speakers used for the training consists of a plurality of sets (set A and set B) of speech spoken by a TTS or a person, and speech of the intermediate speaker consists of a plurality of sets (set A, set C, and set D) of speech spoken by a TTS or a person.

The intermediate conversion function generation unit 101 first performs training based on the speech set A of a source speaker and the speech set A of the intermediate speaker In. and generates a conversion function F(TTS(A)) to convert the speech set A of the source speaker to the speech set A of the intermediate speaker In. (step S1401).

The target conversion function generation unit 102 then converts the speech set A of the source speaker by using the conversion function F(TTS(A)) generated in step S1401 and generates a converted Tr. set A (step S1402).

The target conversion function generation unit 102 then performs training based on the converted Tr. set A and the speech set A of a target speaker Tag.1 and generates a conversion function G1(Tr.(A)) to convert the speech of the intermediate speaker to the speech of the target speaker Tag.1 (step S1403).

Similarly, the target conversion function generation unit 102 converts the speech set B of the source speaker by using the conversion function F(TTS(A)) and generates a converted Tr. set B (step S1404). The target conversion function generation unit 102 then performs training based on the converted Tr. set B and the speech set B of a target speaker Tag.2 and generates a conversion function G2(Tr.(B)) to convert the speech of the intermediate speaker to the speech of the target speaker Tag.2 (step S1405).

The intermediate conversion function generation unit 101 performs training based on the speech set C of a source speaker Src.1 and the speech set C of the intermediate speaker In. and generates a conversion function F(Src.1(C)) to convert the speech of the source speaker Src.1 to the speech of the intermediate speaker In. (step S1406).

Similarly, the intermediate conversion function generation unit 101 performs training based on the speech set D of a source speaker Src.2 and the speech set D of the intermediate speaker In. and generates a conversion function F(Src.2(D)) to convert the speech of the source speaker Src.2 to the speech of the intermediate speaker In. (step S1407).

In the conversion process, the intermediate voice conversion unit 211 uses the conversion function F(Src.1(C)) to convert any speech of the source speaker Src.1 to speech of the intermediate speaker In. (step S1408). The target voice conversion unit 212 then uses the conversion function G1(Tr.(A)) or the conversion function G2(Tr.(B)) to convert the speech of the intermediate speaker In. to speech of the target speaker Tag.1 or the target speaker Tag.2 (step S1409).

Similarly, the intermediate voice conversion unit 211 uses the conversion function F(Src.2(D)) to convert any speech of the source speaker Src.2 to speech of the intermediate speaker In. (step S1410). The target voice conversion unit 212 then uses the conversion function G1(Tr.(A)) or the conversion function G2(Tr.(B)) to convert the speech of the intermediate speaker In. to speech of the target speaker Tag.1 or the target speaker Tag.2 (step S1411).

In this pattern, the utterance of the source speakers and the intermediate speaker and the utterance of the intermediate speaker and the target speakers in the training can be nonparallel corpuses.

If the intermediate speaker is a TTS, any speech content can be generated from the TTS. Therefore, the utterance spoken by the source speakers Src.1 and Src.2 having the mobile terminals 20 to obtain the conversion function F for performing voice conversion does not need to be predetermined utterance. Also, if a source speaker is a TTS, the speech content of a target speaker does not need to be predetermined utterance.

[2] Conversion Mode which uses Unconverted Feature Parameter

Next, the case where the conversion functions are training in the conversion mode which uses unconverted feature parameter will be described. In the above-described conversion mode which uses converted feature parameter, the conversion functions G are generated by taking into account of the procedure in actual voice conversion processing. In contrast, in the conversion mode which uses unconverted feature parameter, the conversion functions F and the conversion functions G are independently trained. In this mode, while the number of training steps is reduced, the accuracy of converted voice will be slightly degraded.

(1) FIG. 14 shows a training process and a conversion process in the case where speech of the intermediate speaker for the training consists of one set (set A) of speech.

The intermediate conversion function generation unit 101 first performs training based on the speech set A of a source speaker Src.1 and the speech set A of the intermediate speaker In. and generates a conversion function F(Src.1(A)) (step S1501). Similarly, the intermediate conversion function generation unit 101 performs training based on the speech set A of a source speaker Src.2 and the speech set A of the intermediate speaker In. and generates a conversion function F(Src.2(A)) (step S1502).

The target conversion function generation unit 102 then performs training based on the speech set A of the intermediate speaker In. and the speech set A of a target speaker Tag.1 and generates a conversion function G1(In.(A)) (step S1503). Similarly, the target conversion function generation unit 102 performs training based on the speech set A of the intermediate speaker In. and the speech set A of a target speaker Tag.2 and generates a conversion function G2(In.(A)) (step S1504).

In the conversion process, the intermediate voice conversion unit 211 uses the conversion function F(Src.1(A)) to convert any speech of the source speaker Src.1 to speech of the intermediate speaker In. (step S1505). The target voice conversion unit 212 then uses the conversion function G1(In.(A)) or the conversion function G2(In.(A)) to convert the speech of the intermediate speaker In. to speech of the target speaker Tag.1 or the target speaker Tag.2 (step S1506).

Similarly, the intermediate voice conversion unit 211 uses the conversion function F(Src.2(A)) to convert any speech of the source speaker Src.2 to speech of the intermediate speaker In. (step S1507). The target voice conversion unit 212 then uses the conversion function G1(In.(A)) or the conversion function G2(In.(A)) to convert the speech of the intermediate speaker In. to speech of the target speaker Tag.1 or the target speaker Tag.2 (step S1508).

Thus, when only one set (set A) is recorded for the utterance of the intermediate speaker to perform the training, the utterance of the source speakers and the target speakers need to be the same set (set A) of utterance as in the conversion mode which uses converted feature parameter. However, compared with the conventional example, the number of conversion functions to be generated by the training is reduced.

(2) FIG. 15 shows a training process and a conversion process in the case where speech of the intermediate speaker consists of a plurality of sets (set A, set B, set C, and set D) of speech spoken by a TTS or a person.

The intermediate conversion function generation unit 101 first performs training based on the speech set A of a source speaker Src.1 and the speech set A of the intermediate speaker In. and generates a conversion function F(Src. 1(A)) (step S1601). Similarly, the intermediate conversion function generation unit 101 performs training based on the speech set B of a source speaker Src.2 and the speech set B of the intermediate speaker In. and generates a conversion function F(Src.2(B)) (step S1602).

The target conversion function generation unit 102 then performs training based on the speech set C of the intermediate speaker In. and the speech set C of a target speaker Tag.1 and generates a conversion function G1(In.(C)) (step S1603). Similarly, the target conversion function generation unit 102 performs training based on the speech set D of the intermediate speaker In. and the speech set D of a target speaker Tag.2 and generates a conversion function G2(In.(D)) (step S1604).

In the conversion process, the intermediate voice conversion unit 211 uses the conversion function F(Src.1(A)) to convert any speech of the source speaker Src.1 to speech of the intermediate speaker In. (step S1605). The target voice conversion unit 212 then uses the conversion function G1(In.(C)) or the conversion function G2(In.(D)) to convert the speech of the intermediate speaker In. to speech of the target speaker Tag.1 or the target speaker Tag.2 (step S1606).

Similarly, the intermediate voice conversion unit 211 uses the conversion function F(Src.2(B)) to convert any speech of the source speaker Src.2 to speech of the intermediate speaker In. (step S1607). The target voice conversion unit 212 then uses the conversion function G1(In.(C)) or the conversion function G2(In.(D)) to convert the speech of the intermediate speaker In. to speech of the target speaker Tag.1 or the target speaker Tag.2 (step S1608).

Thus, if the intermediate speaker is a TTS, it is semipermanently possible to let the intermediate speaker speak in a certain voice characteristic. Since the TTS can generate speech of the same utterance as that spoken by the source speakers and the intermediate speaker irrespective of the utterance of the source speakers and the intermediate speaker, no constraint is imposed on the utterance of the source speakers and the intermediate speaker in the training. This improves convenience for use and allows easy generation of the conversion functions. In addition, the utterance of the source speakers and the target speakers can be nonparallel corpuses.

(3) FIG. 16 shows a training process and a conversion process in the case where part of speech of source speakers consists of a plurality of sets (here, set C and set D) of speech spoken by a TTS or a person, and speech of the intermediate speaker consists of a plurality of sets (here, set A, set B, set C, and set D) of speech spoken by the TTS or a person.

The target conversion function generation unit 102 performs training based on the speech set A of the intermediate speaker In. and the speech set A of a target speaker Tag.1 and generates a conversion function G1(In.(A)) (step S1701).

Similarly, the target conversion function generation unit 102 performs training based on the speech set B of the intermediate speaker In. and the speech set B of a target speaker Tag.2 and generates a conversion function G2(In.(B)) (step S1702).

The intermediate conversion function generation unit 101 performs training based on the speech set C of a source speaker Src.1 and the speech set C of the intermediate speaker In. and generates a conversion function F(Src.1(C)) (step S1703).

Similarly, the intermediate conversion function generation unit 101 performs training based on the speech set D of a source speaker Src.2 and the speech set D of the intermediate speaker In. and generates a conversion function F(Src.2(D)) (step S1704).

In the conversion process, the intermediate voice conversion unit 211 uses the conversion function F(Src.1(C)) to convert any speech of the source speaker Src.1 to speech of the intermediate speaker In. (step S1705). The target voice conversion unit 212 then uses the conversion function G1(In.(A)) or the conversion function G2(In.(B)) to convert the speech of the intermediate speaker In. to speech of the target speaker Tag.1 or the target speaker Tag.2 (step S1706).

Similarly, the intermediate voice conversion unit 211 uses the conversion function F(Src.2(D)) to convert any speech of the source speaker Src.2 to speech of the intermediate speaker In. (step S1707). The target voice conversion unit 212 then uses the conversion function G1(In.(A)) or the conversion function G2(In.(B)) to convert the speech of the intermediate speaker In. to speech of the target speaker Tag.1 or the target speaker Tag.2 (step S1708).

In this pattern, if the intermediate speaker is a TTS, the utterance of the source speakers can be changed to match the utterance of the intermediate speakers and the target speakers. This allows flexible training of the conversion functions. In addition, the utterance of the source speakers and the target speakers in the training can be nonparallel corpuses.

(Evaluation)

Now, description will be given of the procedure of an experiment performed for objectively evaluating the accuracy of voice conversion in a conventional method and the present method, and the experimental result.

Here, a feature parameter conversion method based on a Gaussian Mixture Model (GMM) was used as a voice conversion technique (for example, see A. Kain and M. W. Macon, "Spectral voice conversion for text-to-speech synthesis," Proc. ICASSP, pp. 285-288, Seattle, U.S.A. May, 1998).

The voice conversion technique based on the GMM will be described below. A feature parameter x of speech of a speaker who is a conversion source and a feature parameter y of speech of a speaker who is a conversion target, which are associated with each other on a frame-by-frame basis in a time domain, are represented respectively as $$x=[x_0, x_1 \ldots, x_{p-1}]^T$$

$$y=[y_0, y_1 \ldots, y_{p-1}]^T \quad \text{[Formula 1]}$$

where p is the number of dimensions of the feature parameter, and T represents transposition. In the GMM, the probability distribution p(x) of the feature parameter x of the speech is represented as $$p(x) = \sum_{i=1}^{m} \alpha_i N\left(x; \mu_i, \sum_i\right) \quad \text{[Formula 2]}$$

$$\sum_{i=1}^{m} \alpha_i = 1, \quad \alpha_i \geq 0$$

where αi is the weight for a class i, and m is the number of classes. N(x;μi,Σi) is a normal distribution with a mean vector μi and a covariance matrix Σi for the class i, and it is represented as follows.

$$N\left(x; \mu_i, \sum_i\right) = \frac{\left|\sum_i\right|^{-1/2}}{(2\pi)^{p/2}} \exp\left[-\frac{1}{2}(x-\mu_i)^T \sum_i^{-1} (x-\mu_i)\right] \quad \text{[Formula 3]}$$

The conversion function F(x) to convert the feature parameter x of speech of the source speaker to the feature parameter y of the target speaker is represented as $$F(x) = \sum_{i=1}^{m} h_i(x)\left[\mu_i^{(y)} + \sum_i^{(yx)} \left(\sum_i^{(xx)}\right)^{-1} (x - \mu_i^{(x)})\right] \quad \text{[Formula 4]}$$

where μi(x) and μi(y) represent the mean vector of x and y for the class i, respectively. Σi(xx) represents the covariance matrix of x for the class i, and Σi(yx) represents the cross-covariance matrix of y and x for the class i. hi(x) is as follows.

$$h_i(x) = \frac{\alpha_i N\left(x; \mu_i^{(x)}, \sum_i^{(xx)}\right)}{\sum_{j=1}^{m} \alpha_j N\left(x; \mu_j^{(x)}, \sum_j^{(xx)}\right)} \quad \text{[Formula 5]}$$

The conversion function F(x) is trained by estimating the conversion parameters (αi, μi(x), μi(y), Σi(xx), and Σi(yx)). The joint feature vector z of x and y is defined as follows.

$$z = [x^T, y^T]^T \quad \text{[Formula 6]}$$

The probability distribution p(z) of z is represented by the GMM as $$p(z) = \sum_{i=1}^{m} \alpha_i N\left(z; \mu_i^{(z)}, \sum_i^{(z)}\right) \quad \text{[Formula 7]}$$

$$\sum_{i=1}^{m} \alpha_i = 1, \quad \alpha_i \geq 0$$

where the covariance matrix Σi(z) and the mean vector μi(z) of z for the class i are represented respectively as follows.

$$\sum_i^{(z)} = \begin{bmatrix} \sum_i^{(xx)} & \sum_i^{(xy)} \\ \sum_i^{(yx)} & \sum_i^{(yy)} \end{bmatrix} \quad \text{[Formula 8]}$$

$$\mu_i^{(z)} = \begin{bmatrix} \mu_i^{(x)} \\ \mu_i^{(y)} \end{bmatrix}$$

The conversion parameters (αi, μi(x), μi(y), Σi(xx), and Σi(yx)) can be estimated using a well-known EM algorithm.

No linguistic information such as text was used in the training, and the feature parameter extraction and the GMM training were all performed automatically using a computer. The experiment employed one male and one female (one male speaker A and one female speaker B) as source speakers, one female speaker as an intermediate speaker I, and one male as a target speaker T.

As training data, a subset consisting of 50 sentences in ATR phoneme balance sentences (for example, see Masanobu Abe, Yoshinori Sagisaka, Tetsuo Umeda, Hisao Kuwabara, “Speech database user's manual,” ATR Technical Report, TR-I-0166, 1990) was used. As evaluation data, a subset consisting of 50 sentences not included in the training data was used.

Speech was subjected to STRAIGHT analysis (for example, see H. Kawahara et al. “Restructuring speech representation using a pitch-adaptive time-frequency smoothing and an instantaneous-frequency-based f0 extraction: possible role of a repetitive structure in sounds,” Speech Communication, Vol. 27, No. 3-4, pp. 187-207, 1999). The sampling cycle was 16 kHz, and the frame shift was 5 ms. As the spectral feature parameter of speech, cepstral coefficients of the order 1 to 41 converted from STRAIGHT spectrums were used. The number of GMM mixtures was 64. As the evaluation measure for the conversion accuracy, cepstral distortion was used. Evaluation was performed by computing the distortion between the cepstrums of the source speaker after conversion and the cepstrums of the target speaker. The cepstral distortion is represented as an equation (1), where a smaller value means higher evaluation, $$\text{Cepstral Distortion [dB]} = \frac{20}{\ln 10}\sqrt{2\sum_{i=1}^{p}\left(c_i^{(x)} - c_i^{(y)}\right)^2} \quad \text{[Formula 9]}$$

where Ci(x) represents the cepstral coefficient of speech of the target speaker, Ci(y) represents the cepstral coefficient of the converted speech, and p represents the order of the cepstrum coefficients. In this experiment, p=41.

FIG. 17 shows a graph of the experimental result. The axis of ordinates in the graph indicates the cepstral distortion, which is the average value for all frames of frame-by-frame cepstral distortions determined by the equation (1).

The portion (a) represents distortions between the cepstrums of the source speakers (A and B) and the cepstrums of the target speaker T. The portion (b) corresponds to the conventional method and represents distortions between the cepstrums of the source speakers (A and B) after conversion and the cepstrums of the target speaker T, where the training directly performed between the source speakers (A and B) and the target speaker T. The portions (c) and (d) correspond to application of the present method. The portion (c) will be specifically described. Let F(A) be the intermediate conversion function for conversion from the source speaker A to the intermediate speaker I, and G(A) be the target conversion function for conversion from the speech generated from the source speaker A using F(A) to speech of the target speaker T. Similarly, let F(B) be the intermediate conversion function for conversion from the source speaker B to the intermediate speaker I, and G(B) be the target conversion function for conversion from the speech generated from the source speaker B using F(B) to speech of the target speaker T. The portion (c) represents the distortion (source speaker A→target speaker T) between the cepstrums of the source speaker A after two-step conversion and the cepstrums of the target speaker T, where the cepstrums of the source speaker A after two-step conversion means that the cepstrums of the source speaker A have been converted to the cepstrums of the intermediate speaker I using F(A) and further converted to the cepstrums of the target speaker T using G(A). Similarly, the portion (c) also represents the distortion (source speaker B→target speaker T) between the cepstrums of the source speaker B after two-step conversion and the cepstrums of the target speaker T, where the cepstrums of the source speaker B after two-step conversion means that the cepstrums of the source speaker B have been converted to the cepstrums of the intermediate speaker I using F(B) and further converted into the cepstrums of the target speaker T using G(B).

The portion (d) represents the case where a target conversion function G for the other source speaker was used in the case (c). Specifically, the portion (d) represents the distortion (source speaker A→target speaker T) between the cepstrums of the source speaker A after two-step conversion and the cepstrums of the target speaker T, where the cepstrums of the source speaker A after two-step conversion means that the cepstrums of the source speaker A have been converted to the cepstrums of the intermediate speaker I using F(A) and further converted to the cepstrums of the target speaker T using G(B). Similarly, the portion (d) represents the distortion (source speaker B→target speaker T) between the cepstrums of the source speaker B after two-step conversion and the cepstrums of the target speaker T, where the cepstrums of the source speaker B after two-step conversion means that the cepstrums of the source speaker B have been converted to the cepstrums of the intermediate speaker I using F(B) and further converted to the cepstrums of the target speaker T using G(A).

From this graph, it can be seen that the conversion via the intermediate speaker can maintain almost the same quality as in the conventional method because the conventional method (b) and the present method (c) take almost the same cepstral distortion values. Further, the conventional method (b) and the present method (d) take almost the same cepstral distortion values. Therefore, it can be seen that the conversion via the intermediate speaker can maintain almost the same quality as in the conventional method even when G generated based on any source speaker and unique to each target speaker is commonly used as the target conversion function for conversion from the intermediate speaker to the target speaker.

As having been described above, the server 10 trains and generates each conversion function F to convert speech of each of one or more source speakers to speech of one intermediate speaker, and each conversion function G to convert speech of the one intermediate speaker to speech of each of one or more target speakers. Therefore, when a plurality of source speakers and a plurality of target speakers exist, only the conversion functions to convert speech of each of the source speakers to speech of the intermediate speaker and the conversion functions to convert speech of the intermediate speaker to speech of each of the target speakers need to be provided to be able to convert speech of each of the source speakers to speech of each of the target speakers. That is, voice conversion can be performed with fewer conversion functions than in the case where conversion functions for converting speech of each of the source speakers to speech of each of the target speakers are provided as conventional. Thus, it is possible to perform training and generate the conversion functions with a low load, and to perform voice conversion using these conversion functions.

The user who uses the mobile terminal 20 to perform voice conversion on his/her speech can have a single conversion function F generated for converting his/her speech to speech of the intermediate speaker and store the conversion function F in the mobile terminal 20. The user can then download a conversion function G to convert speech of the intermediate speaker to speech of a user-desired target speaker from the server 10. Thus, the user can easily convert his/her speech to speech of the target speaker.

The target conversion function generation unit 102 can generate, as the target conversion function, a function to convert converted speech of the source speaker converted by using the conversion function F, to speech of the target speaker. Therefore, the conversion function that matches processing in actual situation of voice conversion can be generated. This allows an increase in the voice accuracy in actual situation of voice conversion compared with the case where a conversion function to convert speech directly collected from the intermediate speaker to the target speaker is generated.

If speech of the intermediate speaker is speech generated from a TTS, it is possible to let the TTS speak the same utterance as the source speakers and the target speakers whatever utterance they speak. Therefore, no constraints are imposed on the utterance of the source speakers and the target speakers in the training. This eliminates effort for collecting specific utterance from the source speakers and the target speakers, allowing easy training of the conversion functions.

If speech of a source speaker is speech of a TTS in the conversion mode which uses converted feature parameter, it is possible to let the TTS as the source speaker speak any utterance to match utterance of the target speaker. This allows easy training of the conversion function G without being constrained by utterance of a target speaker.

For example, if speech of the target speaker is speech of an animation character or a movie actor, a sound source recorded in the past can be used to perform the training.

In addition, the use of a composed conversion function of the conversion function F and the conversion function G to perform voice conversion allows a reduction in time and memory required for voice conversion.

(Variations)

(1) In the above-described embodiment, it has been described that the server 10 includes the intermediate conversion function generation unit 101 and the target conversion function generation unit 102, and the mobile terminal 20 includes the intermediate voice conversion unit 211 and the target voice conversion unit 212, among the apparatuses that constitute the voice conversion client-server system 1. However, this is not a limitation. Rather, any arrangement may be adopted for the apparatus configuration within the voice conversion client-server system 1, and any arrangement may be adopted for the arrangement of the intermediate conversion function generation unit 101, the target conversion function generation unit 102, the intermediate voice conversion unit 211, and the target voice conversion unit 212 within the apparatuses that constitute the voice conversion client-server system 1.

For example, a single apparatus may include all functionality of the intermediate conversion function generation unit 101, the target conversion function generation unit 102, the intermediate voice conversion unit 211, and the target voice conversion unit 212.

Among the conversion function training functionality, the intermediate conversion function generation unit 101 may be included in the mobile terminal 20, and the target conversion function generation unit 102 may be included in the server 10. In this case, a program for training and generating the conversion function F needs to be stored in the nonvolatile memory of the mobile terminal 20.

With reference to FIG. 18, description will be given below of the procedure of generating the conversion function F in the mobile terminal 20 where the mobile terminal 20 includes the intermediate conversion function generation unit 101.

FIG. 18(*a*) shows the procedure where the utterance of a source speaker x is fixed. When the utterance of the source speaker A is fixed, speech of the intermediate speaker of the fixed utterance is stored in advance in the nonvolatile memory of the mobile terminal 20. Training is performed based on the speech of the source speaker x collected with the microphone mounted in the mobile terminal 20 and the speech of the intermediate speaker i stored in the mobile terminal 20 (step S601) to obtain the conversion function F(x) (step S602).

FIG. 18(*b*) shows the procedure in the case where the utterance of the source speaker x is arbitrary. In this case, the mobile terminal 20 is equipped with a speech recognition device which converts speech to text, and a TTS which converts text to speech.

The speech recognition device first performs speech recognition on the speech of the source speaker x collected with the microphone mounted in the mobile terminal 20 and converts the utterance of the source speaker x into text (step S701), which is input to the TTS. The TTS generates speech of the intermediate speaker i (TTS) from the text (step S702).

The intermediate conversion function generation unit 101 performs training based on the speech of the intermediate speaker i (TTS) and speech of the source speaker (step S703) to obtain the conversion function F(x) (step S704).

(2) In the above-described embodiment, it has been described that the voice conversion unit 21 consists of the intermediate voice conversion unit 211 that uses the conversion function F to convert speech of a source speaker to speech of the intermediate speaker, and the target voice conversion unit 212 that uses the conversion function G to convert speech of the intermediate speaker to speech of a target speaker. However, this is only an example, and the voice conversion unit 21 may have functionality of using a composed function of the conversion function F and the conversion function G to directly convert speech of the source speaker to speech of the target speaker.

(3) By applying the voice conversion functionality according to the present invention to transmit side mobile phone and receive side mobile phone, speech input to the transmit side mobile phone can be subjected to voice conversion and the converted speech can be output from the receive side mobile phone. In this case, the following patterns may be possible as processing patterns in the transmit side mobile phone and receive side mobile phone.

1) After LSP (Line Spectral Pair) coefficients are converted in the transmit side mobile phone (see FIG. 19(*a*)), decoding is performed in the receive side mobile phone (see FIG. 19(*c*)).

2) After LSP coefficients and a sound source signal are converted in the transmit side mobile phone (see FIG. 19(*b*)), decoding is performed in the receive side mobile phone (see FIG. 19(*c*)).

3) After encoding is performed in the transmit side mobile phone (see FIG. 20(*a*)), LSP coefficients are converted and decoding is performed in the receive side mobile phone (see FIG. 20(*b*)).

4) After encoding is performed in the transmit side mobile phone (see FIG. 20(*a*)), LSP coefficients and a sound source signal are converted and decoding is performed in the receive side mobile phone (see FIG. 20(*c*)).

To be precise, performing conversion in the receive side mobile phone as in the above patterns 3) and 4) requires information about the conversion function of the transmitting person (the person who inputs speech), such as an index that determines the conversion function for the transmitting person or a cluster of conversion functions to which the transmitting person belongs.

Thus, by only adding the voice conversion functionality that uses LSP coefficient conversion, sound source conversion, or the like to existing mobile phones, voice conversion of speech transmitted and received between the mobile phones can be performed without system or infrastructure changes.

As shown in FIG. 21, voice conversion can also be performed in the server. While both LSP coefficients and a sound source signal are converted in FIG. 21, only the LSP coefficients may be converted.

(4) In the above embodiment, a TTS is used as the speech synthesis device. However, a device that converts input utterance to speech of a predetermined voice characteristic may also be used.

(5) In the above embodiment, description has been given of two-step voice conversion that involves conversion to speech of the intermediate speaker. However, this is not a limitation but multi-step voice conversion that involves conversion to speech of a plurality of intermediate speakers may also be possible.

INDUSTRIAL APPLICABILITY

The present invention can be utilized for a voice conversion service that realizes conversion from speech of a large number of users to speech of various target speakers with a small amount of conversion training and a few conversion functions.

The invention claimed is:

1. A voice conversion system that converts speech of a source speaker to speech of a target speaker, comprising:

a voice conversion means for converting the speech of the source speaker to the speech of the target speaker via conversion to speech of an intermediate speaker.

2. A voice conversion training system that trains functions to convert speech of each of one or more source speakers to speech of each of one or more target speakers, comprising:

an intermediate conversion function generation means for training and generating an intermediate conversion function to convert the speech of the source speaker to speech of one intermediate speaker commonly provided for each of the one or more source speakers; and a target conversion function generation means for training and generating a target conversion function to convert the speech of the intermediate speaker to the speech of the target speaker.

3. The voice conversion training system according to claim 2, wherein the target conversion function generation means generates, as the target conversion function, a function to convert converted speech of the source speaker by using the intermediate conversion function, to the speech of the target speaker.

4. The voice conversion training system according to claim 2, wherein the speech of the intermediate speaker is speech synthesized from a speech synthesis device that synthesizes any utterance with a predetermined voice characteristic.

5. The voice conversion training system according to claim 2, wherein the speech of the source speaker is speech synthesized from a speech synthesis device that synthesizes any utterance with a predetermined voice characteristic.

6. The voice conversion training system according to claim 2, further comprising a conversion function composition means for generating a function to convert the speech of the source speaker to the speech of the target speaker by composing the intermediate conversion function generated by the intermediate conversion function generation means and the target conversion function generated by the target conversion function generation means.

7. A voice conversion system comprising:

a voice conversion means for converting the speech of the source speaker to the speech of the target speaker using the functions generated by the voice conversion training system according to any one of claims 2 to 6.

8. The voice conversion system according to claim 7, wherein the voice conversion means comprises:

an intermediate voice conversion means for generating the speech of the intermediate speaker from the speech of the source speaker by using the intermediate conversion function; and a target voice conversion means for generating the speech of the target speaker from the speech of the intermediate speaker generated by the intermediate voice conversion means by using the target conversion function.

9. The voice conversion system according to claim 7, wherein the voice conversion means converts the speech of the source speaker to the speech of the target speaker by using a composed function of the intermediate conversion function and the target conversion function.

10. The voice conversion system according claim 7, wherein the voice conversion means converts a spectral sequence that is a feature parameter of speech.

11. A voice conversion client-server system that converts speech of each of one or more users to speech of each of one or more target speakers, in which a client computer and a server computer are connected with each other over a network, wherein the client computer comprises:

a user's speech acquisition means for acquiring the speech of the user;

a user's speech transmission means for transmitting the speech of the user acquired by the user's speech acquisition means to the server computer;

an intermediate conversion function reception means for receiving from the server computer an intermediate conversion function to convert the speech of the user to speech of one intermediate speaker commonly provided for each of the one or more users; and a target conversion function reception means for receiving from the server computer a target conversion function to convert the speech of the intermediate speaker to the speech of the target speaker, wherein the server computer comprises:

a user's speech reception means for receiving the speech of the user from the client computer;

an intermediate speaker's speech storage means for storing the speech of the intermediate speaker in advance;

an intermediate conversion function generation means for generating the intermediate conversion function r to convert the speech of the user to the speech of the intermediate speaker;

a target speaker's speech storage means for storing the speech of the target speaker in advance;

a target conversion function generation means for generating the target conversion function to convert the speech of the intermediate speaker to the speech of the target speaker;

an intermediate conversion function transmission means for transmitting the intermediate conversion function to the client computer; and a target conversion function transmission means for transmitting the target conversion function to the client computer, and wherein the client computer further comprises:

an intermediate voice conversion means for generating the speech of the intermediate speaker from the speech of the user by using the intermediate conversion function; and a target voice conversion means for generating the speech of the target speaker from the speech of the intermediate speaker by using the target conversion function.

12. A non-transitory computer readable storage medium tangibly embodied in a storage device storing instructions which, when executed by a processor, perform at least one of:

generating by an intermediate conversion function generation unit, each intermediate conversion function to convert speech of each of one or more source speakers to speech of one intermediate speaker; and generating by a target conversion function generation unit, each target conversion function to convert the speech of the one intermediate speaker to speech of each of one or more target speakers.

13. A non-transitory computer readable storage medium tangibly embodied in a storage device storing instructions which, when executed by a processor, perform a voice conversion method, comprising:

acquisition step of acquiring by a conversion function acquisition unit, an intermediate conversion function to convert speech of a source speaker to speech of an intermediate speaker and a target conversion function to convert the speech of the intermediate speaker to speech of a target speaker;

generating by an intermediate voice conversion unit, the speech of the intermediate speaker from the speech of the source speaker by using the intermediate conversion function acquired; and generating by a target voice conversion unit, the speech of the target speaker from the speech of the intermediate speaker generated in the intermediate voice conversion step by using the target conversion function acquired.

14. The voice conversion system according to claim 8, wherein the voice conversion means converts a spectral sequence that is a feature parameter of speech.

15. The voice conversion system according to claim 9, wherein the voice conversion means converts a spectral sequence that is a feature parameter of speech.

* * * * *